(12) United States Patent
Takata et al.

(10) Patent No.: US 12,475,001 B1
(45) Date of Patent: Nov. 18, 2025

(54) COMPUTER SYSTEM AND BACKUP MANAGEMENT METHOD

(71) Applicant: Hitachi Vantara, Ltd., Kanagawa (JP)

(72) Inventors: Masanori Takata, Tokyo (JP); Mitsuo Hayasaka, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/828,585

(22) Filed: Sep. 9, 2024

(30) Foreign Application Priority Data

May 14, 2024 (JP) ................................. 2024-078477

(51) Int. Cl.
*G06F 11/14* (2006.01)
(52) U.S. Cl.
CPC ...... *G06F 11/1464* (2013.01); *G06F 2201/84* (2013.01)
(58) Field of Classification Search
None
See application file for complete search history.

(56) References Cited

U.S. PATENT DOCUMENTS

2020/0301595 A1    9/2020    Akutsu et al.

FOREIGN PATENT DOCUMENTS

JP    2020-155071 A    9/2020

*Primary Examiner* — Eddy Cheung
(74) *Attorney, Agent, or Firm* — Mattingly & Malur, PC

(57) ABSTRACT

A computer system includes a backup generation management program that executes generation deletion processing of deleting backup data and a management file corresponding to M generations (M is an integer of 1 or more), when a reduction cost to be reduced by a generation deletion processing is larger than a load cost. The generation deletion processing acquires differential data of the backup data corresponding to M generations from (N+1)th generation (N is an integer of 1 or more) to (N+M)th generations. The differential data is stored in a cloud storage and the Nth generation backup data is overwritten with the differential data. The management files are merged from Nth to (N+M) th generations and the management data is associated with the Nth generation backup data. Then, the backup data and the management files from (N+1)th to (N+M)th generations are deleted.

15 Claims, 19 Drawing Sheets

FIG.5

| CLOUD ID | STORAGE CLASS | CAPACITY CHARGING (MONTHLY AMOUNT) | TRANSFER AMOUNT CHARGING | | REQUEST CHARGING (PER 1000 REQUESTS) |
|---|---|---|---|---|---|
| | | | IN | OUT | |
| CLOUD A | STORAGE CLASS 1 | 0.02USD/GB | 0.00USD/GB | 0.1USD/GB | 0.005USD |
| | STORAGE CLASS 2 | 0.01USD/GB | 0.00USD/GB | 0.1USD/GB | 0.01USD |
| | STORAGE CLASS 3 | 0.005USD/GB | 0.00USD/GB | 0.1USD/GB | 0.02USD |
| CLOUD B | STORAGE CLASS 1 | 0.03USD/GB | 0.00USD/GB | 0.2USD/GB | 0.01USD |
| | STORAGE CLASS 2 | 0.02USD/GB | 0.00USD/GB | 0.2USD/GB | 0.02USD |
| | STORAGE CLASS 3 | 0.01USD/GB | 0.00USD/GB | 0.2USD/GB | 0.03USD |

FIG.6

| CLOUD ID 601 | COMPUTE TYPE 602 | TIME CHARGING (PER ONE HOUR) 603 | REQUEST CHARGING (PER 1 MILLION REQUESTS) 604 |
|---|---|---|---|
| CLOUD A | VIRTUAL MACHINE 1 | 0.8USD | - |
| | VIRTUAL MACHINE 2 | 1.4USD | - |
| | CONTAINER 1 | 0.06USD | - |
| | CONTAINER 2 | 0.08USD | - |
| | SERVERLESS | - | 0.2USD |
| CLOUD B | VIRTUAL MACHINE 1 | 0.9USD | - |
| | VIRTUAL MACHINE 2 | 1.5USD/GB | - |
| | CONTAINER 1 | 0.07USD | - |
| | CONTAINER 2 | 0.09USD | - |
| | SERVERLESS | - | 0.3USD |

| LOCATION ID | COMPUTE TYPE | STORAGE CLASS | DATA STORAGE POWER CONSUMPTION AMOUNT | COMPUTE PROCESSING POWER CONSUMPTION AMOUNT | COMMUNICATION PROCESSING POWER CONSUMPTION AMOUNT |
|---|---|---|---|---|---|
| ON-PREMISES A | SmartNIC | - | - | 10Wh/GB | 20Wh/GB |
| | VIRTUAL MACHINE 1 | - | - | 5Wh/GB | 10Wh/GB |
| | VIRTUAL MACHINE 2 | - | - | 5Wh/GB | 10Wh/GB |
| | CONTAINER 1 | - | - | 3Wh/GB | 5Wh/GB |
| | CONTAINER 2 | - | - | 2Wh/GB | 3Wh/GB |
| CLOUD A | SERVERLESS | - | - | 1Wh/GB | 2Wh/GB |
| | - | STORAGE CLASS 1 | 0.2Wh/GB | - | - |
| | - | STORAGE CLASS 2 | 0.1Wh/GB | - | - |
| | - | STORAGE CLASS 3 | 0.05Wh/GB | - | - |
| | VIRTUAL MACHINE 1 | - | - | 10Wh/GB | 15Wh/GB |
| | VIRTUAL MACHINE 2 | - | - | 10Wh/GB | 15Wh/GB |
| | CONTAINER 1 | - | - | 5Wh/GB | 10Wh/GB |
| | CONTAINER 2 | - | - | 5Wh/GB | 10Wh/GB |
| CLOUD B | SERVERLESS | - | - | 2Wh/GB | 5Wh/GB |
| | - | STORAGE CLASS 1 | 0.2Wh/GB | - | - |
| | - | STORAGE CLASS 2 | 0.1Wh/GB | - | - |
| | - | STORAGE CLASS 3 | 0.05Wh/GB | - | - |

FIG. 8

| LOCATION ID | COMPUTE TYPE | STORAGE CLASS | DATA STORAGE CO2 EMISSION AMOUNT | COMPUTE PROCESSING CO2 EMISSION AMOUNT | COMMUNICATION PROCESSING CO2 EMISSION AMOUNT |
|---|---|---|---|---|---|
| ON-PREMISES A | SmartNIC | - | - | 10g-CO2/GB | 20g-CO2/GB |
| | VIRTUAL MACHINE 1 | - | - | 5g-CO2/GB | 10g-CO2/GB |
| | VIRTUAL MACHINE 2 | - | - | 5g-CO2/GB | 10g-CO2/GB |
| | CONTAINER 1 | - | - | 3g-CO2/GB | 5g-CO2/GB |
| CLOUD A | CONTAINER 2 | - | - | 2g-CO2/GB | 3g-CO2/GB |
| | SERVERLESS | - | - | 1g-CO2/GB | 2g-CO2/GB |
| | - | STORAGE CLASS 1 | 0.2g-CO2/GB | - | - |
| | - | STORAGE CLASS 2 | 0.1g-CO2/GB | - | - |
| | - | STORAGE CLASS 3 | 0.05g-CO2/GB | - | - |
| | VIRTUAL MACHINE 1 | - | - | 10g-CO2/GB | 15g-CO2/GB |
| | VIRTUAL MACHINE 2 | - | - | 10g-CO2/GB | 15g-CO2/GB |
| | CONTAINER 1 | - | - | 5g-CO2/GB | 10g-CO2/GB |
| CLOUD B | CONTAINER 2 | - | - | 5g-CO2/GB | 10g-CO2/GB |
| | SERVERLESS | - | - | 2g-CO2/GB | 5g-CO2/GB |
| | - | STORAGE CLASS 1 | 0.2g-CO2/GB | - | - |
| | - | STORAGE CLASS 2 | 0.1g-CO2/GB | - | - |
| | - | STORAGE CLASS 3 | 0.05g-CO2/GB | - | - |

FIG.9

| LOCATION ID | COMPUTE TYPE | PROCESSING TIME | COMMUNICATION TIME |
|---|---|---|---|
| ON-PREMISES A | SmartNIC | 1 SECOND/GB | 0.1 SECONDS/GB |
| CLOUD A | VIRTUAL MACHINE 1 | 1 SECOND/GB | 0.001 SECONDS/GB |
| | VIRTUAL MACHINE 2 | 1 SECOND/GB | 0.001 SECONDS/GB |
| | CONTAINER 1 | 1 SECOND/GB | 0.001 SECONDS/GB |
| | CONTAINER 2 | 1 SECOND/GB | 0.001 SECONDS/GB |
| | SERVERLESS | 2 SECONDS/GB | 0.001 SECONDS/GB |
| CLOUD B | VIRTUAL MACHINE 1 | 0.5 SECONDS/GB | 0.002 SECONDS/GB |
| | VIRTUAL MACHINE 2 | 1 SECOND/GB | 0.002 SECONDS/GB |
| | CONTAINER 1 | 0.5 SECONDS/GB | 0.002 SECONDS/GB |
| | CONTAINER 2 | 1 SECOND/GB | 0.002 SECONDS/GB |
| | SERVERLESS | 2 SECONDS/GB | 0.002 SECONDS/GB |

COMPUTER SYSTEM AND BACKUP MANAGEMENT METHOD

CROSS-REFERENCE TO RELATED APPLICATION

The present application claims priority from Japanese application JP2024-078477, filed on May 14, 2024, the content of which is hereby incorporated by reference into this application.

BACKGROUND OF THE INVENTION

1. Field of the Invention

The present invention relates to a technique for efficiently managing backup data stored in a cloud system.

2. Description of the Related Art

As a method of backing up data, a technique of creating a plurality of generations of snapshots of a storage device is known.

As a technique related to a snapshot, for example, JP 2020-155071 A discloses a storage control device that creates a plurality of generations of snapshots of a storage device, the storage control device including: a first calculation unit that calculates, as a first number of regions, the number of regions that are updated in a first snapshot that is a deletion target among the plurality of generations of snapshots and that are not updated in a second snapshot that is a generation continuous with the first snapshot; a second calculation unit that calculates, as a second number of regions, the number of regions that are updated in the second snapshot; and a determination unit that determines the second snapshot as a merge target in merge processing and the first snapshot as a merge destination in merge processing in a case where the first number of regions is equal to or greater than the second number of regions, and determines the first snapshot as a merge target in merge processing and the second snapshot as a merge destination in merge processing in a case where the first number of regions is less than the second number of regions.

SUMMARY OF THE INVENTION

It is required to efficiently manage backup data stored in a cloud system.

Therefore, an object of the present invention is to provide a technique capable of efficiently managing backup data.

In order to achieve the above object, a computer system according to one aspect is a computer system including: a cloud system that provides a cloud storage; a local storage system that is connected to the cloud system via a network; and a backup function unit that backs up snapshot data of the local storage system as backup data to the cloud storage, in which the cloud storage includes the backup data and a management file associated with each of the backup data, the computer system comprises a management function unit that manages the backup data stored in the cloud storage and the management file for each generation, the management function unit compares a load cost applied to generation deletion processing with a reduction cost reduced by the generation deletion processing, and executes the generation deletion processing in a case where the reduction cost is larger than the load cost, the generation deletion processing is a process of deleting backup data and a management file of predetermined M generations (M is an integer of 1 or more), and includes a first process, a second process, a third process, and a fourth process, the first process is a process of acquiring differential data of backup data of M generations from an (N+1)th generation to an (N+M)th generation, which is one generation newer than a predetermined Nth generation (N is an integer of 1 or more), the second process is a process of storing the differential data in the cloud storage and overwriting a backup data of an Nth generation in the cloud storage, the third process is a process of merging from the management file of the Nth generation associated with the backup data of the Nth generation to a management file of the (N+M)th generation associated with backup data of the (N+M)th generation in the cloud storage and associating the management file with the backup data of the Nth generation, and the fourth process is a process of deleting backup data and management files of the (N+1)th generation to the (N+M)th generation in the cloud storage.

According to the present invention, backup data can be efficiently managed.

BRIEF DESCRIPTION OF THE DRAWINGS

FIG. 5 is a configuration diagram of a storage charging table;

FIG. 6 is a configuration diagram of a compute system charging table;

FIG. 7 is a configuration diagram of a power consumption amount table;

FIG. 8 is a configuration diagram of a $CO_2$ emission amount table;

FIG. 9 is a configuration diagram of a processing time table;

DESCRIPTION OF THE PREFERRED EMBODIMENTS

Figure 1:
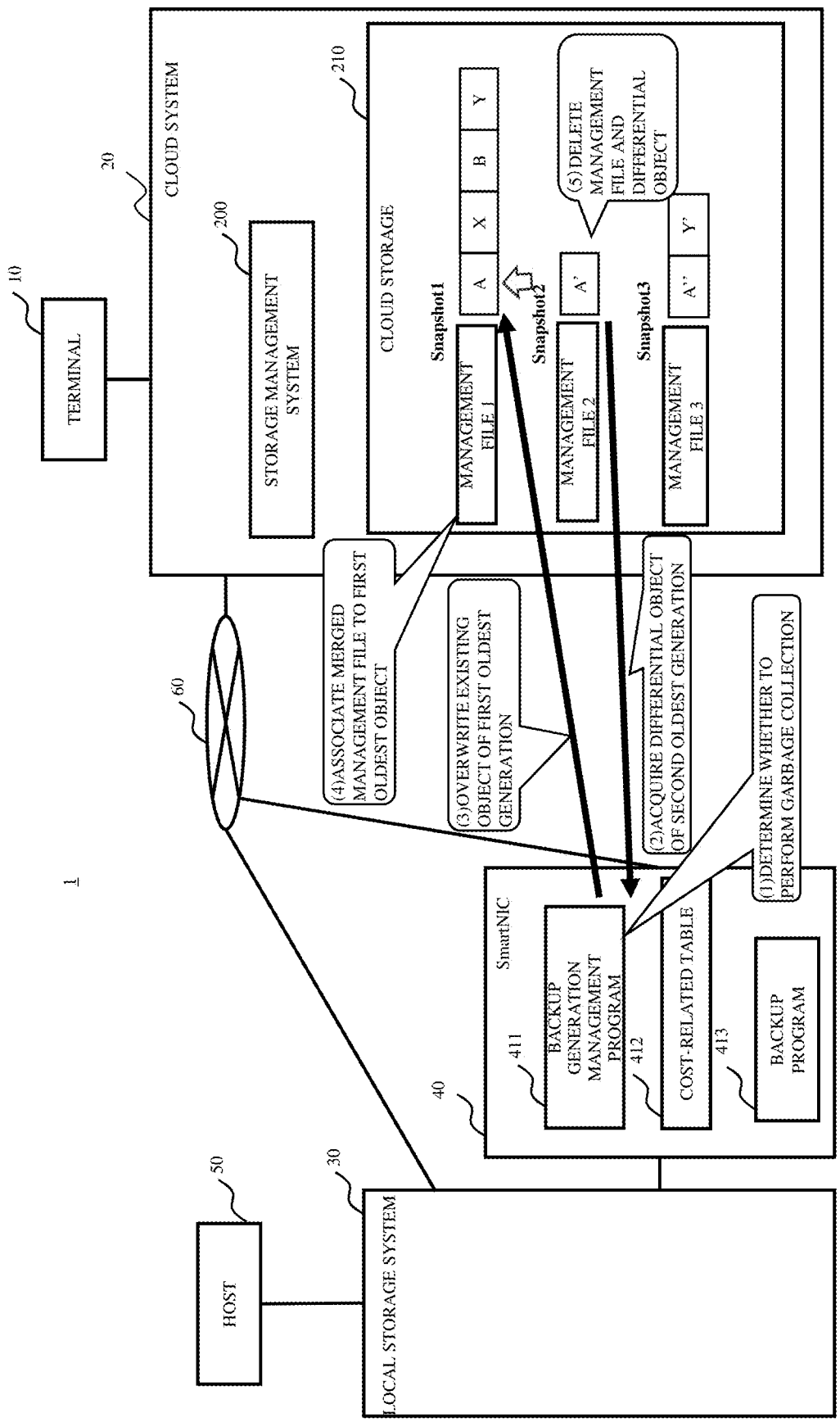
FIG. 1 is a configuration diagram of a computer system according to a first embodiment.

Some embodiments are described with reference to the drawings. Note that the embodiments described below do not limit the invention according to the claims, and all of various elements and combinations thereof described in the embodiments are not necessarily essential to the solution of the invention.

Note that, in the following description, various types of information may be described using an expression "aaa table", but the various types of information may be expressed using a data structure other than the table. The "aaa table" can be referred to as "aaa information" to indicate that the various types of information do not depend on the data structure.

In addition, in describing the content of each piece of information, expressions such as "identifier", "name", and "ID" are used for the identification information, but these can be replaced with each other. Instead of at least one of these, another type of identification information may be used.

In addition, in the following description, there is a case where processing is described with a "program" as an operation subject, but the program is executed by a processor to perform predetermined processing appropriately using a storage resource (for example, memory) and/or a communication interface device (for example, a communication port), so that the operation subject of the processing may be a processor. Conversely, it can be interpreted that the processing in which the processor is the operation subject is performed by executing one or more programs. The processor is typically a microprocessor such as a central processing unit (CPU), but may include a hardware circuit that executes a part of processing (for example, encryption/decryption, compression/decompression).

In addition, in the following description, reference numerals may be used when the same type of elements are not distinguished, and identifiers (for example, at least one of numbers and codes) allocated to the elements may be used instead of the reference numerals of the elements when the same type of elements are distinguished and described.

First Embodiment

FIG. 1 is a configuration diagram of a computer system according to a first embodiment.

The first embodiment is an example in which a backup generation management program 411 on a SmartNIC 40 connected to a local storage system 30 manages the generation of the backup data to a cloud storage 210. The cloud storage 210 holds backup data for X generation (X is an integer of 1 or more) from the latest generation. For example, it is assumed that backup is performed once a day and backup data for 30 generations is held. The backup generation management program 411 monitors the number of generations of the backup data transferred to the cloud storage 210, and in a case where the number of generations exceeds a set retention number, deletes the first oldest backup generation to achieve generation management for the backup.

A computer system 1 includes a terminal 10, a cloud system 20, a local storage system 30, a SmartNIC 40, one or more hosts 50, and a network 60. The cloud system 20, the local storage system 30, and the SmartNIC 40 are connected via the network 60. The network 60 is a network such as a wide area network (WAN). The terminal 10 and the cloud system 20 are connected by, for example, a network such as a local area network (LAN) or a WAN. The host 50 and the local storage system 30 are connected by, for example, a network such as a LAN or a WAN.

The cloud system 20 includes a storage management system 200 and a cloud storage 210.

The terminal 10 is a terminal used by an administrator who manages the cloud system 20.

The host 50 executes various processing using the logical volume provided from the local storage system 30.

The local storage system 30 is, for example, a disk array device that provides data protection by Redundant Array of Independent (or Inexpensive) Disks (RAID), a data copy function inside and outside the local storage system 30, and the like.

The SmartNIC 40 executes processing related to backup of data stored in the local storage system 30. The SmartNIC 40 includes a backup generation management program 411, a cost-related table 412, and a backup program 413.

The backup generation management program 411 manages the data of the backup transferred to the cloud storage 210 and the management file for each generation. The backup generation management program 411 monitors the number of generations of the backup, monitors the number of generations of the backup transferred to the cloud storage 210, and executes generation deletion processing of deleting the backup data of the first oldest generation in a case where the number of generations exceeds the set retention number. The backup generation management program 411 compares the load cost for the generation deletion processing with the reduction cost reduced by the generation deletion processing, and determines whether to execute the generation deletion processing. For example, the backup generation management program 411 calculates a charge amount due to garbage collection at the time of generation deletion processing as a cost, and determines whether to perform garbage collection ((1) in FIG. 1).

Here, the garbage collection means that data referred to only by the generation of the backup to be deleted is deleted. Since data referred to only by the generation of the backup to be deleted is unused data, a capacity charge occurs if the data is held in the cloud storage 210. Therefore, it is desirable to delete unused data in the backup generation deletion processing. Since it is necessary to acquire data from the cloud storage 210 along with the garbage collation, transfer amount charging and request charging occur. Therefore, in the present embodiment, the capacity charge amount (A) (reduction cost) that can be reduced when the garbage collection is performed and the transfer charge amount (B)+the request charge amount (C) (total amount, load cost, load charge amount) required for the garbage collection are calculated, and the garbage collection is performed only when the capacity charge amount (A) that can be reduced exceeds the transfer charge amount (B)+the request charge amount (C) required for the garbage collection. Specifically, for example, the capacity charge amount (A) that can be reduced in a case where the garbage collection is performed and the transfer charge amount (B)+the request charge amount (C) required for the garbage collection are calculated by acquiring a second oldest generation management file from the cloud storage 210 and referring to the cost-related table 412 (see FIG. 4). Here, the management file is, for example, a bitmap indicating in which area the differential data exists between backup generations.

In a case where the capacity charge amount (A) that can be reduced by the garbage collection exceeds the transfer charge amount (B)+the request charge amount (C) required for the garbage collection, the backup generation management program 411 executes processing (first process) of acquiring a differential object of the second oldest generation from the cloud storage 210 ((2) in FIG. 1). Here, the differential object is an object in which differential data between backup generations is prepacked and stored.

Thereafter, the backup generation management program 411 executes a process (second process) of overwriting the existing object of the first oldest generation with the acquired differential data of the differential object ((3) in FIG. 1). At this time, the backup generation management program 411 uses a function provided by the cloud storage 210 or the like to transfer data only for a part having differential data (using a first function), and copies a part of an existing object for a part having no differential data (using a second function). For example, only a part having differential data is transferred using a multipart upload application programming interface (API). That is, a part number or an ID is indicated to the multipart upload API, a part having differential data is stored by using the UploadPart API, and a part having no differential data is copied from an existing object of the cloud storage 210 by using the UploadPart-Copy API. Therefore, a part having no differential data remains as an existing object.

Further, the backup generation management program 411 executes a process (third process) of associating a management file obtained by merging a management file of the first oldest generation and a management file of the second oldest generation with the first oldest object. For example, the backup generation management program 411 changes the name of the management file obtained by merging the management file of the first oldest generation and the management file of the second oldest generation to the management file name of the first oldest generation ((4) in FIG. 1). When the name of the object cannot be directly changed in the cloud storage 210, the backup generation management program 411 may create a management file obtained by merging a management file of the first oldest generation and a management file of the second oldest generation, and transfer the created management file as an object having the first oldest generation management file name.

Further, the backup generation management program 411 executes a process (fourth process) of deleting the management file of the second oldest generation and the differential object ((5) FIG. 1).

With these processing, the cost in the cloud system 20 can be reduced in the generation management of the backup using the cloud storage 210.

As the cost, not only the charge amount due to the garbage collation in the backup generation deletion processing but also another index may be used. For example, the power consumption amount may be set as the cost. That is, the backup generation management program 411 may compare the power consumption amount (load cost) related to the backup generation deletion processing with the power consumption amount (reduction cost) reduced by the backup generation deletion processing as an index and determine whether to perform the garbage collection. Through these processing, the power consumption in the cloud system 20 can be reduced in the generation management of the backup using the cloud storage 210.

In addition, the management file may not be a bitmap as long as it can indicate in which region the differential data exists between generations. For example, a logical block addressing (LBA) may be used to manage in which region among the respective generations the differential data exists in units of LBAs.

Next, the cloud system 20 will be described in detail.

Figure 2:
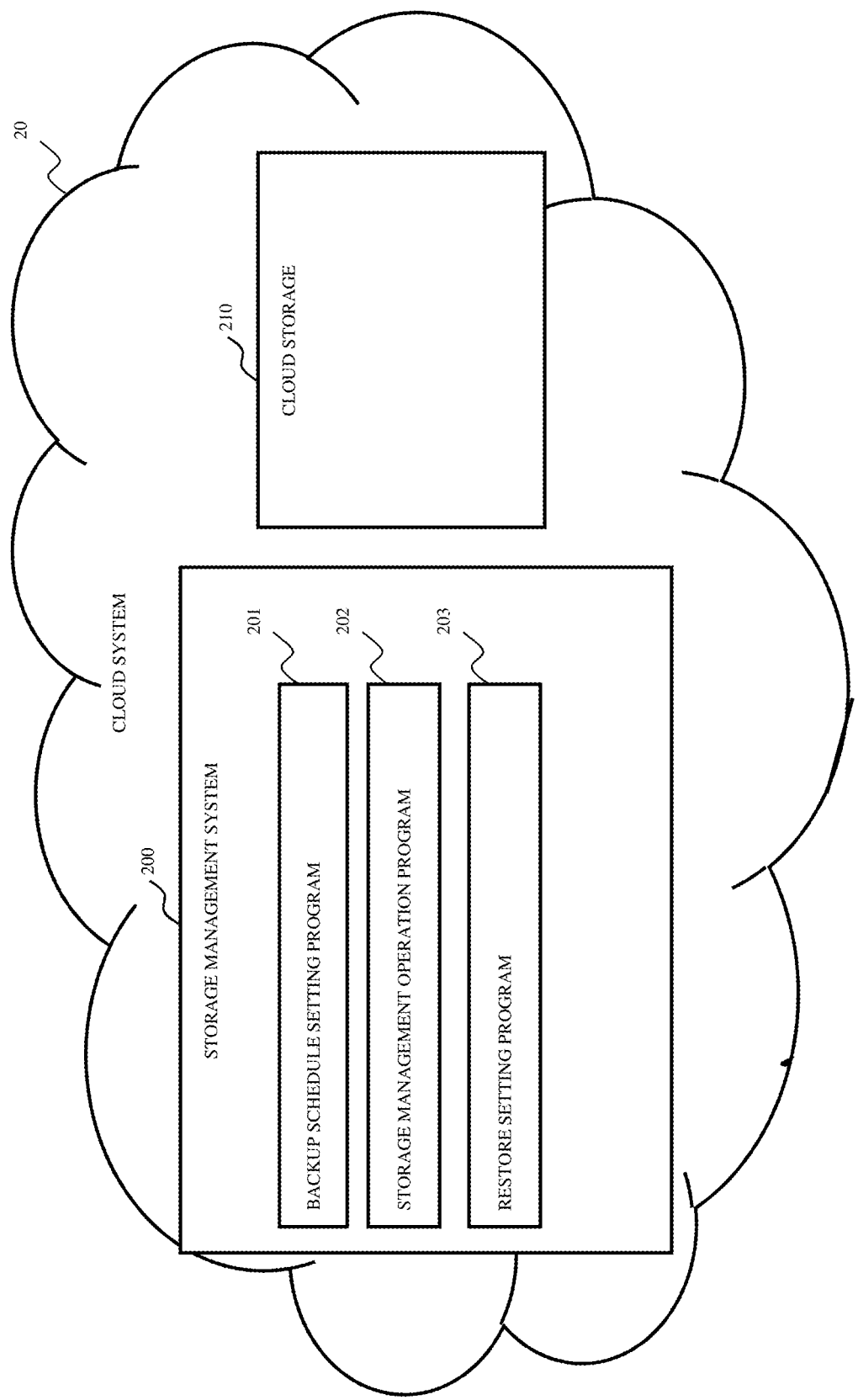
FIG. 2 is a configuration diagram of a cloud system.

FIG. 2 is a configuration diagram of a cloud system.

The cloud system 20 includes a storage management system 200 and a cloud storage 210. The storage management system 200 and the cloud storage 210 are constructed by resources (processor, memory, etc.) allocated from a plurality of servers constituting the cloud system 20.

The storage management system 200 is a system that manages operation of a plurality of local storage systems 30 in the cloud system 20 and outside the cloud system 20.

The storage management system 200 includes a backup schedule setting program 201, a storage management operation program 202, and a restore setting program 203. The backup schedule setting program 201 is executed by a processor allocated to the storage management system 200 to execute a process of setting a backup schedule of the local storage system 30. The storage management operation program 202 is executed by a processor allocated to the storage management system 200 to execute a process of operating the local storage system 30 in the cloud system 20 and outside the cloud system 20. For example, the storage management operation program 202 operates the local storage system 30 using an API for operation management provided by the local storage system 30. The restore setting program 203 is executed by a processor allocated to the storage management system 200 to execute a process of setting data backed up in the cloud storage 210 for restoration to the local storage system 30 in the cloud system 20 and outside the cloud system 20.

The cloud storage 210 is a system that stores data. The cloud storage 210 provides objects, files, blocks, and the like as data input/output interfaces.

Next, the local storage system 30 will be described in detail.

Figure 3:
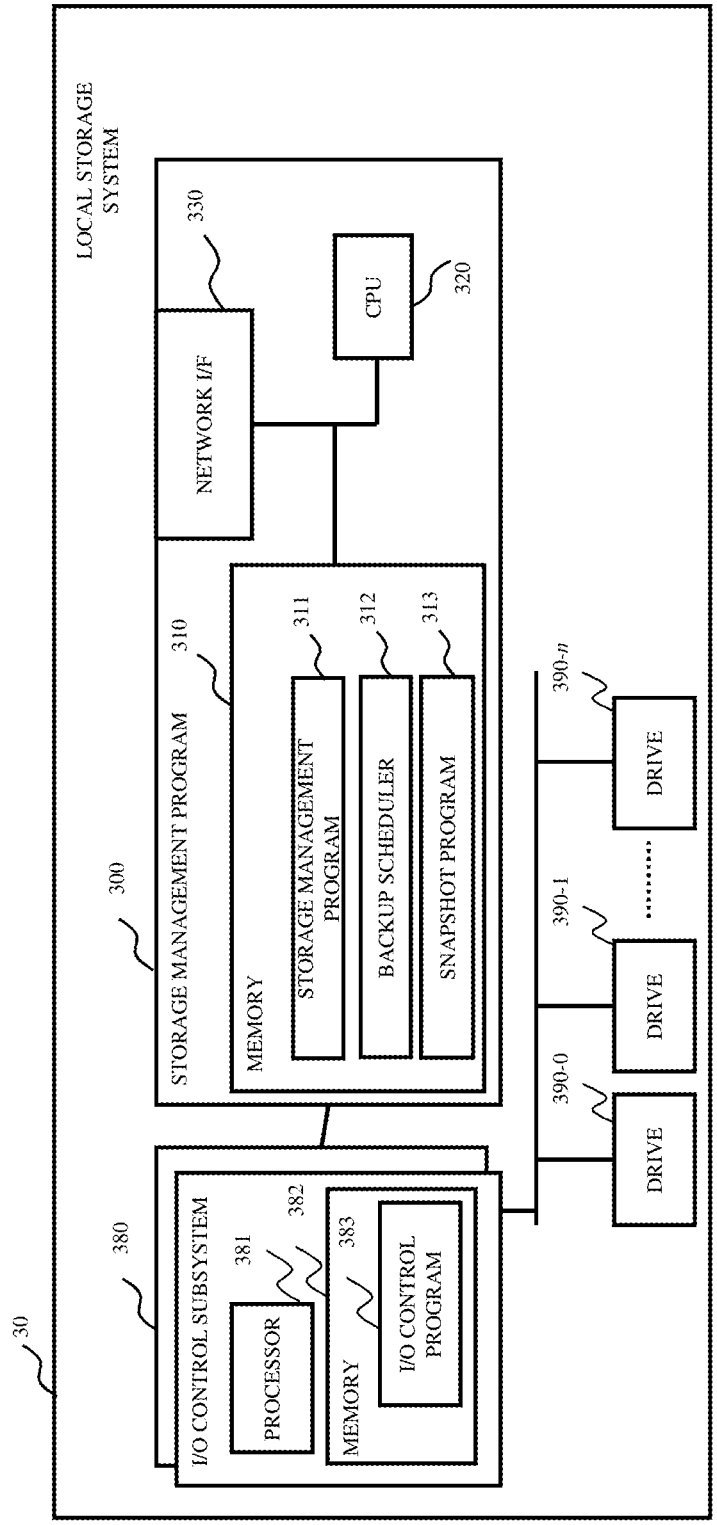
FIG. 3 is a configuration diagram of a local storage system.

FIG. 3 is a configuration diagram of the local storage system.

The local storage system 30 is a system that provides a block access to the host 50, and includes a storage management subsystem 300, a plurality of redundant I/O control subsystems 380, and a plurality of drives 390 (390-0, 390-1, . . . , 390-*n*).

The drive 390 is a physical storage device such as a solid state drive (SSD) or a hard disk drive (HDD). The drive 390 stores data (volume data) of a volume provided by the local storage system 30. For example, the volume data is snapshot data (hereinafter, a snapshot) or the like.

The I/O control subsystem 380 configures one or more logical volumes based on the storage region of the connected drive 390, and provides the logical volume. The I/O control subsystem 380 issues read/write I/O to the drive 390 based on read/write I/O and executes I/O processing.

The I/O control subsystem 380 includes a processor 381 and a memory 382. The processor 381 executes various processing according to a program stored in the memory 382. The memory 382 is, for example, a random access memory (RAM), and stores a program executed by the processor 381 and necessary information. The memory 382 stores an I/O control program 383.

The storage management subsystem 300 includes a memory 310, a CPU 320, and a network I/F 330. These configurations (310, 320, 330) are connected to each other by a communication path such as a bus.

The network I/F 330 communicates with other devices (host 50, cloud system 20, and the like) via the network 60 or other networks. The network I/F 330 is connected to the host 50 using, for example, a protocol such as a fibre channel (FC) or iSCSI.

The CPU 320 executes a program stored in the memory 310. The memory 310 is, for example, a RAM, and stores a program executed by the CPU 320 and necessary information. The memory 310 stores a storage management program 311, a backup scheduler 312, and a snapshot program 313.

The storage management program 311 is executed by the CPU 320 to execute a management operation of the local storage system 30. The backup scheduler 312 is executed by the CPU 320 to periodically execute backup. For example, the backup scheduler 312 is executed by the CPU 320 to configure a backup function unit. The snapshot program 313 is executed by the CPU 320 to execute a snapshot operation. Each program and information stored in the memory 310 may be stored in a storage device (not illustrated). In this case, the program is read into the memory 310 and executed by the CPU 320.

Next, the SmartNIC 40 will be described in detail.

Figure 4:
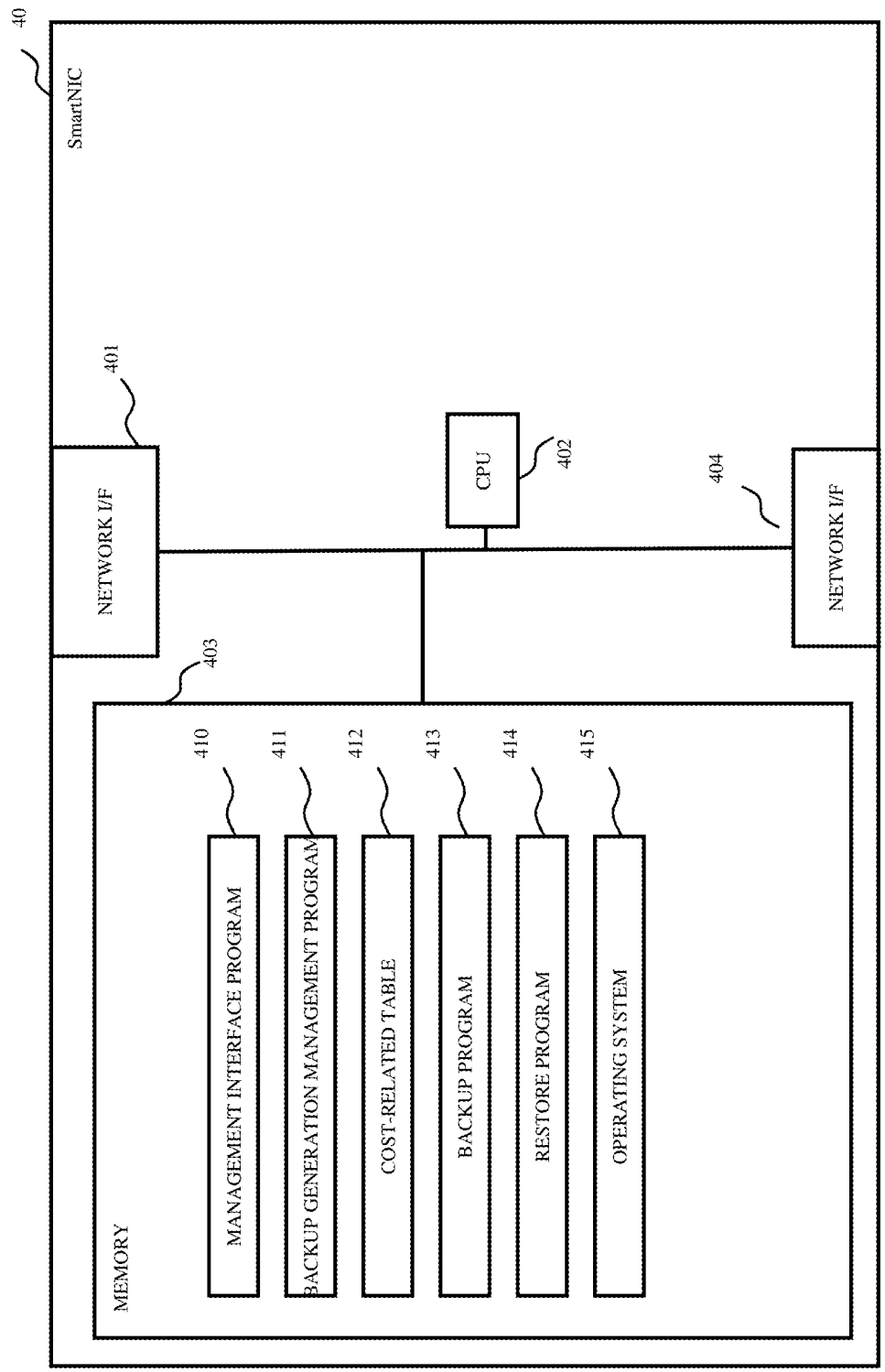
FIG. 4 is a configuration diagram of a SmartNIC.

FIG. 4 is a configuration diagram of a SmartNIC.

The SmartNIC 40 includes a memory 403, a CPU 402, and network I/Fs 401 and 404. These configurations (403, 402, 401, 404) are connected to each other by a communication path such as a bus.

The CPU 402 executes a program stored in the memory 403.

The network I/F 401 communicates with the cloud system 20 via the network 60. The network I/F 404 communicates with the storage management subsystem 300 of the local storage system 30.

The memory 403 is, for example, a RAM, and stores a program executed by the CPU 402 and necessary information. The memory 403 stores a management interface program 410, a backup generation management program 411, a cost-related table 412, a backup program 413, a restore program 414, and an operating system 415. Each program and information stored in the memory 403 may be stored in a storage device (not illustrated). In this case, each program is read into the memory 403 and executed by the CPU 402.

The management interface program 410 is executed by the CPU 402 to provide an API for operating backup management, and accepts an operation via the network 60.

The backup generation management program 411 is executed by the CPU 402 to manage snapshots of a plurality of generations backed up in the cloud storage 210. Here, the CPU 402 executes the backup generation management program 411 to configure a management function unit. When executed by the CPU 402, the backup program 413 communicates with the cloud storage 210 of the cloud system 20 to write and read data. The restore program 414 is executed by the CPU 402 to restore the data backed up in the cloud storage 210 to the local storage system 30. The operating system 415 is executed by the CPU 402 to integrally control the SmartNIC 40 and execute other programs.

The cost-related table 412 is a table that holds cost information related to use of the cloud system 20. The cost-related table 412 includes one or more tables among a storage charging table 500, a compute system charging table 600, a power consumption amount table 700, a CO2 emission amount table 800, and a processing time table 900.

Although the computer system 1 of the present embodiment includes the SmartNIC, the present invention is not limited to this configuration, and the function of the SmartNIC may be realized by a configuration that does not affect the performance of the processor 381 of the I/O control subsystem 380, for example, a physical server, a virtual server, a container, or the like instead of the SmartNIC, or may be realized by the local storage system 30.

Next, the storage charging table 500 will be described.

FIG. 5 is a configuration diagram of the storage charging table.

The storage charging table 500 is a table that holds a charge (charge amount) generated for use of the cloud storage 210. The storage charging table 500 stores an entry corresponding to each storage class of the cloud storage 210 in each cloud.

The entry of the storage charging table 500 includes fields of a cloud ID 501, a storage class 502, a capacity charging 503, a transfer amount charging 504, and a request charging 505.

In the cloud ID 501, identification information (cloud ID) for identifying the cloud to which the cloud storage 210 corresponding to the entry belongs is stored. The cloud ID may be assigned to each type of cloud or may be assigned to each cloud. In the storage class 502, the type of storage (storage class) provided by the cloud storage 210 is stored. For example, the storage class includes a high speed, a standard, and a low speed.

In the capacity charging 503, a charge (capacity charge amount) generated according to the amount of data stored in the cloud storage 210 is stored. The capacity charge amount is, for example, a monthly charge per 1 GB. In the transfer amount charging 504, a charge (transfer charge amount) generated when data is uploaded to the cloud storage 210 (IN) and a charge (transfer charge amount) generated when data is downloaded from the cloud storage 210 (OUT) are stored. The transfer charge amount is, for example, a charge per 1 GB. In the request charging 505, a charge (request charge amount) generated according to the number of requests to the cloud storage 210 is stored. Examples of the request include PUT, POST, GET, and LIST. In a case where the fee varies depending on the type of request, the request charge amount may be stored in the request charging 505 for each type of request. The request charge amount is, for example, a charge per 1000 requests.

Next, the compute system charging table 600 will be described.

FIG. 6 is a configuration diagram of a compute system charging table.

The compute system charging table 600 is a table that holds a fee (charge amount) generated for use of a cloud compute system 220. The compute system charging table 600 stores an entry corresponding to each type of compute system in each cloud. Entries of the compute system charging table 600 include fields of a cloud ID 601, a compute type 602, a time charging 603, and a request charging 604.

In the cloud ID 601, identification information (cloud ID) for identifying the cloud to which the cloud compute system corresponding to the entry belongs is stored. In the compute type 602, the type (compute type) of the cloud compute system corresponding to the entry is stored. Examples of the compute type include virtual machine, container, and serverless.

In the time charging 603, a charge (charge amount) generated per time during which the cloud compute system is activated is stored. For example, in a case where the compute type is a virtual machine or a container, time charging occurs. The time charge amount is, for example, a charge per hour. The request charging 604 is a charge (charge amount) generated for a request to the compute system. For example, in a case where the compute type is serverless, request charging occurs. The request charging is, for example, a charge per 1 million requests.

The storage charging table 500 and the compute system charging table 600 may be stored in the compute system of the SmartNIC 40 or the cloud system 20 when the computer system 1 is constructed. In addition, the backup generation management program 411 may be created when the backup generation management program 411 is installed. In addition, since the cloud system 20 frequently changes the charge, the backup generation management program 411 may periodically check the charge and update the storage charging table 500 and the compute system charging table

600. In addition, a system administrator may update the storage charging table 500 and the compute system charging table 600 via the storage management system 200.

Next, the power consumption amount table 700 will be described.

FIG. 7 is a configuration diagram of a power consumption amount table.

The power consumption amount table 700 is a table for managing the power consumption amount for a predetermined configuration (SmartNIC, cloud storage, cloud compute system) in the computer system 1. The power consumption amount table 700 stores an entry for each predetermined configuration in the computer system 1. The entries of the power consumption amount table 700 include fields of a location ID 701, a compute type 702, a storage class 703, a data storage power consumption amount 704, a compute processing power consumption amount 705, and a communication processing power consumption amount 706.

In the location ID 701, an ID (location ID) for identifying the location of the configuration corresponding to the entry is stored. The location ID includes a cloud and an on-premises (on-pre). In a case where the configuration corresponding to the entry is a compute system or a SmartNIC, the type of compute (compute type) is stored in the compute type 702. Examples of the compute type include SmartNIC, virtual machine, container, serverless, and the like. In a case where the configuration corresponding to the entry is a cloud storage, a storage class provided by the cloud storage is stored in the storage class 703.

In a case where the configuration corresponding to the entry is a cloud storage, a power consumption amount generated according to the amount of data stored in the cloud storage is stored in the data storage power consumption amount 704. The power consumption amount stored in the data storage power consumption amount 704 is, for example, a power consumption amount per 1 GB. In the compute processing power consumption amount 705, the power consumption amount required for the configuration corresponding to the entry to execute the compute processing is stored. The power consumption amount of the compute processing power consumption amount 705 is, for example, a power consumption amount per 1 GB. The power consumption amount necessary for the communication processing is stored in the communication processing power consumption amount 706. The power consumption amount stored in the communication processing power consumption amount 706 is, for example, a power consumption amount per 1 GB.

Next, the CO2 emission amount table 800 will be described.

FIG. 8 is a configuration diagram of a CO2 emission amount table.

The CO2 emission amount table 800 is a table that holds a CO2 emission amount to be emitted for processing in a predetermined configuration in the computer system 1. The CO2 emission amount table 800 stores an entry for each predetermined configuration in the computer system 1. The entry of the CO2 emission amount table 800 includes fields of a location ID 801, a compute type 802, a storage class 803, a data storage CO2 emission amount 804, a compute processing CO2 emission amount 805, and a communication processing CO2 emission amount 806.

In the location ID 801, an ID (location ID) for identifying the location of the configuration corresponding to the entry is stored. The location ID includes a cloud and an on-premises (on-pre). In a case where the configuration corresponding to the entry is a compute system or a SmartNIC, the type of compute (compute type) is stored in the compute type 802. Examples of the compute type include SmartNIC, virtual machine, container, serverless, and the like. In a case where the configuration corresponding to the entry is a cloud storage, a storage class provided by the cloud storage is stored in the storage class 803.

In a case where the configuration corresponding to the entry is a cloud storage, a CO2 emission amount generated according to the amount of data stored in the cloud storage is stored in the data storage CO2 emission amount 804. The CO2 emission amount stored in the data storage CO2 emission amount 804 is, for example, a CO2 emission amount per 1 GB. In the compute processing CO2 emission amount 805, the CO2 emission amount generated when the configuration corresponding to the entry is executed by the compute processing is stored. The CO2 emission amount of the compute processing CO2 emission amount 805 is, for example, a CO2 emission amount per 1 GB. In the communication processing CO2 emission amount 806, the CO2 emission amount generated in the communication processing is stored. The CO2 emission amount stored in the communication processing CO2 emission amount 806 is, for example, a CO2 emission amount per 1 GB. The value of the CO2 emission amount stored in the data storage CO2 emission amount 804, the compute processing CO2 emission amount 805, and the communication processing CO2 emission amount 806 may be acquired from, for example, a tool or information provided by the cloud system 20, and set or updated.

Next, the processing time table 900 will be described.

FIG. 9 is a configuration diagram of a processing time table.

The processing time table 900 is a table that holds a processing time and a communication time when the garbage collation processing is performed by a predetermined configuration in the computer system 1. The processing time table 900 stores an entry for each predetermined configuration in the computer system 1. Entries of the processing time table 900 include fields of a location ID 901, a compute type 902, a processing time 903, and a communication time 904.

In the location ID 901, a location ID of a configuration corresponding to the entry is stored. In the compute type 902, a compute type having a configuration corresponding to the entry is stored. In the processing time 903, a processing time of the garbage collection processing by the configuration corresponding to the entry is stored. The processing time stored in the processing time 903 is, for example, a processing time per 1 GB. In the communication time 904, a communication time of the garbage collection processing by the configuration corresponding to the entry is stored. The communication time of the communication time 904 is, for example, a communication time per 1 GB. Note that the processing time and the communication time of the garbage collation processing stored in the processing time 903 and the communication time 904 may be actual measured values or estimated values.

Next, backup processing in the computer system 1 according to the first embodiment will be described.

Figure 10:
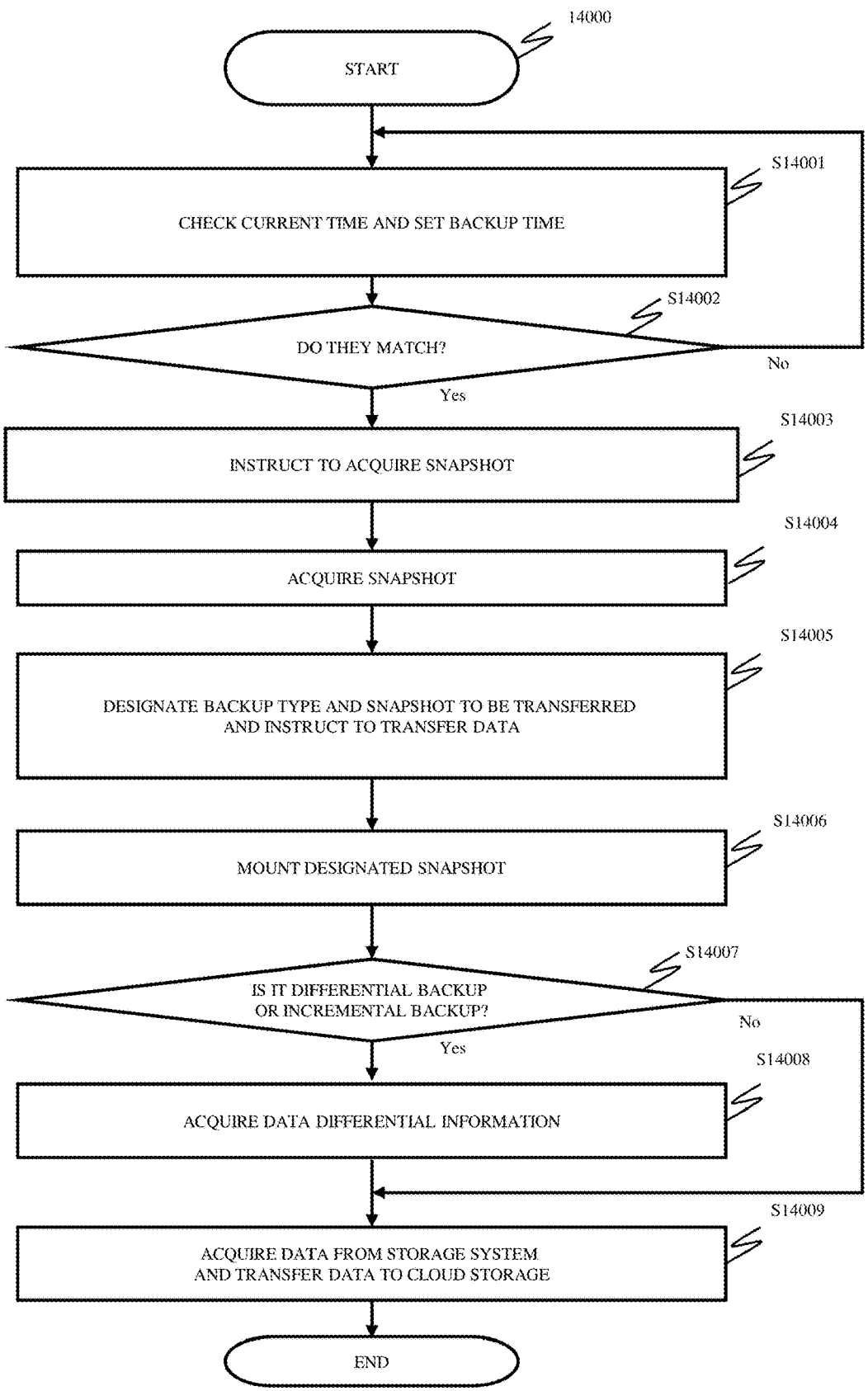
FIG. 10 is a flowchart of backup processing.

FIG. 10 is a flowchart of backup processing.

Backup processing 14000 is a process of creating snapshot data (also referred to as a "snapshot") of data (volume data) of a predetermined volume of the local storage system 30, and backing up differential data from a previous snapshot to the cloud storage 210 as backup data in a case where a new snapshot is created. Note that the backup data may be object data (also referred to as "object").

The backup processing 14000 is periodically executed by, for example, the backup scheduler 312 of the local storage system 30. Note that the backup processing may be executed in a time zone in which the amount of data stored in the local storage system 30 or the index related to the I/O performance is smaller than a predetermined threshold.

The backup scheduler 312 of the local storage system 30 checks the current time and the time (backup time) scheduled as the time at which the set backup is performed (S14001), and determines whether the current time and the backup time match (S14002).

As a result, in a case where the current time and the backup time do not match (S14002: No), the backup scheduler 312 advances the process to step S14001.

On the other hand, in a case where the current time coincides with the backup time (S14002: Yes), the backup scheduler 312 instructs the snapshot program 313 to acquire a snapshot (S14003).

The snapshot program 313 that has received the instruction acquires a snapshot of a volume to be backed up, and returns a response to the backup scheduler 312 (S14004).

The backup scheduler 312 receives the response from the snapshot program and instructs the backup program 413 of the SmartNIC 40 to transfer data by designating a backup type and a snapshot to be transferred (S14005). Here, the backup type is any one of full backup, differential backup, and incremental backup.

The backup program 413 mounts the designated snapshot (S14006). That is, the backup program 413 accesses the snapshot and reads the snapshot.

The backup program 413 checks the designated backup type and determines whether it is a differential backup or an incremental backup (S14007). As a result, in a case where the backup type is the differential backup or the incremental backup (S14007: Yes), the backup program 413 causes the process to proceed to step S14008. On the other hand, in a case where the backup type is not the differential backup or the incremental backup, that is, the full backup (S14007: No), the process proceeds to step S14009.

In step S14008, the backup program 413 acquires data differential information from the storage management program 311 of the local storage system 30. Here, the data differential information is a data difference between snapshots, and includes information of a block updated between a reference past snapshot (a differential backup is an initial snapshot, and an incremental backup is a previous snapshot) and a current snapshot. A method of acquiring the data differential information may be an information sharing volume or another method. For example, the method may be a method in which the backup program 413 may instruct the storage management program 311 of the local storage system 30 through the management network.

In step S14009, the backup program 413 acquires data to be backed up from the local storage system 30, transfers the data to the cloud storage 210, and returns a response to the backup scheduler 312 when the data transfer is completed. Specifically, for example, the presence or absence of the differential data is checked for each part by referring to the data differential information, and the data is stored and transferred in a part having the differential data. When receiving the response from the backup program, the backup scheduler 312 ends the backup processing 14000.

In the backup processing 14000 described above, in a case where the backup program 413 determines the backup type and is the differential backup or the incremental backup, the data differential information is acquired from the storage management program 311. However, the data differential information may be passed to the backup program 413 at a timing when the backup scheduler 312 issues a backup instruction to the backup program 413.

Next, restore processing 15000 in the computer system 1 according to the first embodiment will be described.

Figure 11:
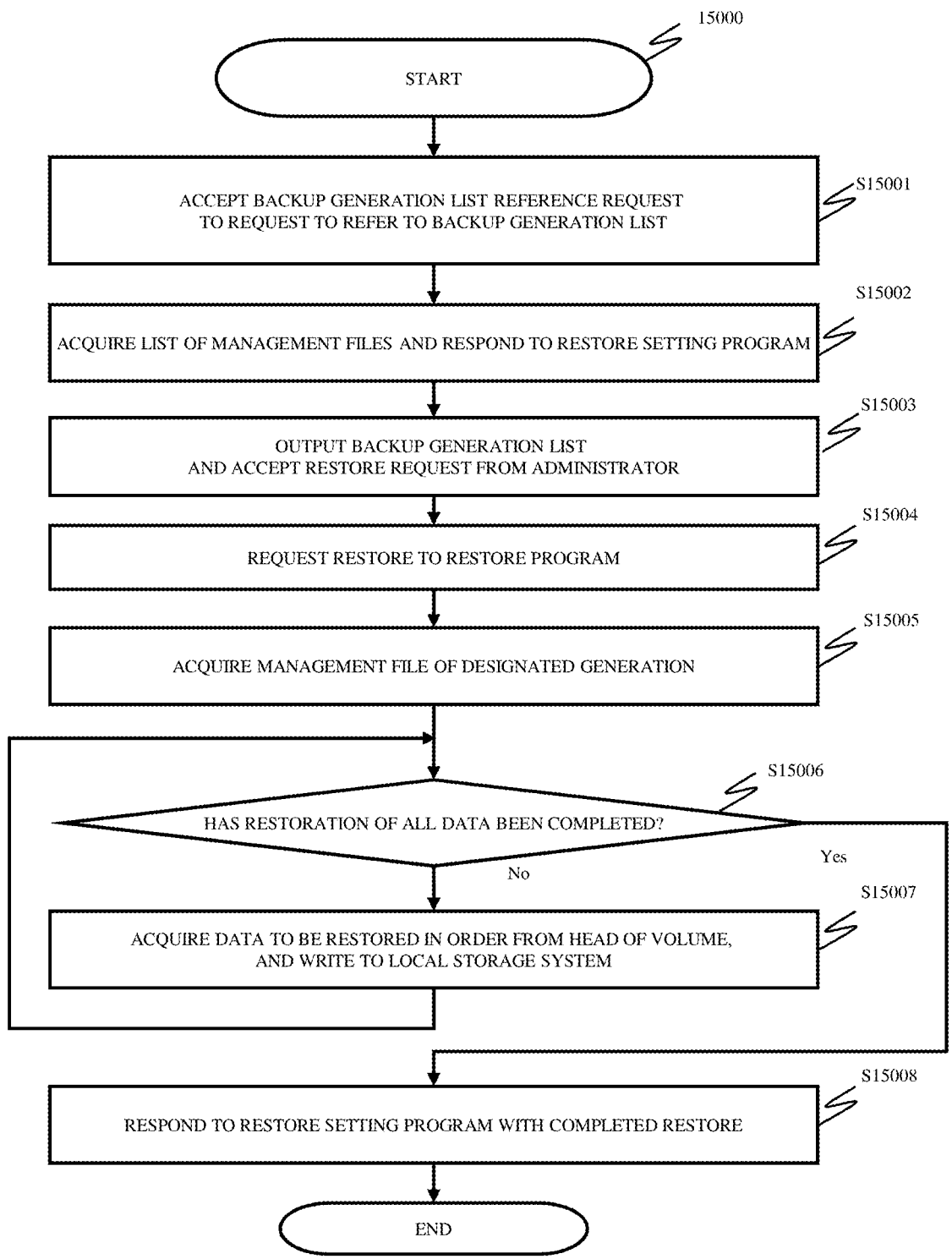
FIG. 11 is a flowchart of restore processing.

FIG. 11 is a flowchart of restore processing.

The restore processing 15000 is started periodically by the restore program 414 of the SmartNIC 40 or by an instruction of an administrator. In the following example, an example of starting by an instruction of an administrator will be described.

First, the restore setting program 203 of the storage management system 200 of the cloud system 20 accepts a backup generation list reference request from the terminal 10 by the administrator, and requests the restore program 414 of the SmartNIC 40 to refer to the backup generation list (S15001).

The restore program 414 acquires a list of management files from the cloud storage 210, and responds to the restore setting program 203, that is, transmits the list of management files (S15002).

The restore setting program 203 receives the list of the management files, outputs the backup generation list on the basis of the list of the management files, and receives a restore request including designation of the generation to be restored from the administrator (S15003).

The restore setting program 203 requests the restore program 414 to restore (S15004). This request includes information on the generation to be restored and the volume of the restoration destination.

The restore program 414 acquires the management file of the generation received in step S15004 from the cloud storage 210 (S15005).

Next, the restore program 414 determines whether the restoration of all the data of the designated generation has been completed (S15006). As a result, in a case where the restoration of all the data has been completed (S15006: Yes), the restore program 414 advances the process to step S15008. On the other hand, in a case where the restoration of all the data is not completed (S15006: No), the restore program 414 acquires the data to be restored from the cloud storage 210 in order from the head of the volume, writes the data to the local storage system 30 (S15007), and advances the process to step S15006.

In step S15008, the restore program 414 responds to the restore setting program 203 that the restore has been completed, and ends the restore processing 15000.

Next, backup generation management processing 9000 in the computer system 1 according to the first embodiment will be described.

Figure 12:
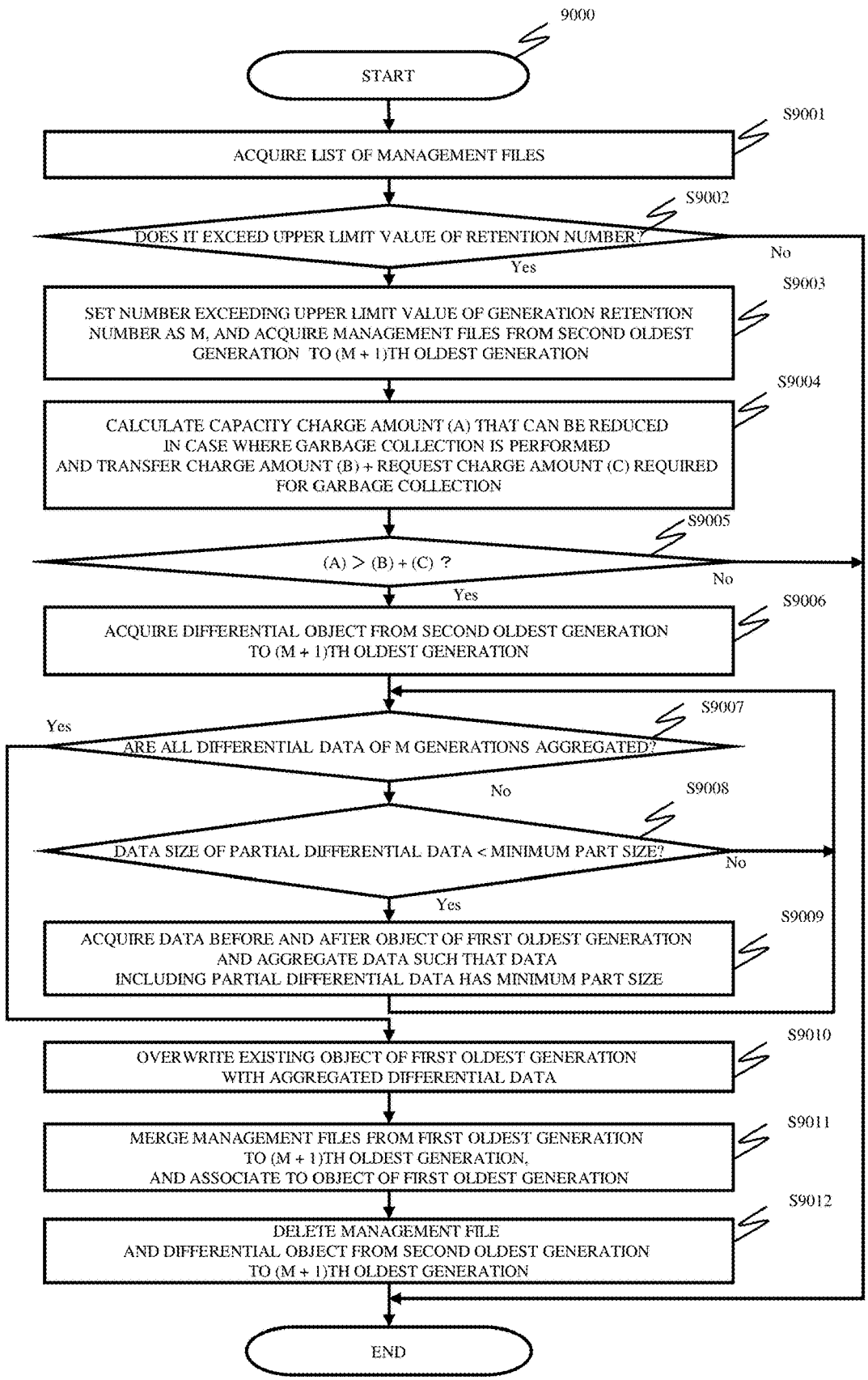
FIG. 12 is a flowchart of backup generation management processing according to the first embodiment.

FIG. 12 is a flowchart of the backup generation management processing. The backup generation management processing 9000 is a process of deleting object data of the oldest M generations (M is an integer of 1 or more) among the object data in the object data in the cloud storage 210 (generation deletion processing).

The backup generation management processing 9000 is executed by the backup generation management program 411 of the SmartNIC 40 periodically or by an instruction of an administrator.

The backup generation management program 411 acquires a list of management files from the cloud storage 210 (S9001). Here, the management file of each backup generation stored in the cloud storage 210 is stored, for example, in the same directory, and the backup generation management program 411 acquires a list of objects in this directory. In the present embodiment, the backup generation management program 411 acquires only the object name as a list and does not acquire the contents of the management file.

The backup generation management program 411 refers to the acquired list of management files and checks whether the retention number (generation retention number) of the number of backup generations (backup generation number) retained in the cloud storage 210 exceeds a preset upper limit value of the retention number (S9002). Here, the generation retention number of the cloud storage 210 can be obtained by calculating the number of management files from the acquired list of management files. The upper limit value of the retention number is reflected in the backup generation management program 411 of the SmartNIC 40, for example, when the administrator sets the upper limit value in the storage management system 200.

In a case where the generation retention number does not exceed the upper limit value of the retention number (S9002: No), it is not necessary to delete the backup generation, and thus, the backup generation management program 411 ends the backup generation management processing 9000.

On the other hand, in a case where the generation retention number exceeds the upper limit value of the retention number (S9002: Yes), the backup generation management program 411 sets the number exceeding the upper limit value of the generation retention number as M, and acquires management files of M generations from the second oldest generation ((N+1)th generation) to the (M+1)th oldest generation ((N+M)th generation) from the cloud storage 210 (S9003). Here, N is the oldest (first oldest) generation and is an integer of 1 or more. In step S9003, for example, in a case where M=1, the management file of the second oldest generation is acquired, and in a case where M=2, the management files of the second oldest generation and the third oldest generation are acquired.

Next, based on the acquired management file and the storage charging table 500, the backup generation management program 411 calculates a capacity charge amount (A) that can be reduced in a case where the garbage collection is performed and a transfer charge amount (B)+a request charge amount (C) required for the garbage collection (S9004). Here, the capacity charge amount (A) that can be reduced in a case where the garbage collation is performed can be calculated by specifying the differential data amount for the backup generations exceeding the upper limit value of the generation retention number from the acquired management files and calculating the reduction amount (reduced charge amount) of the capacity charge amount in a case where the differential data amount is reduced based on the storage charging table 500. In addition, the transfer charge amount (B) required for the garbage collection can be calculated by calculating a charge amount generated according to a transfer amount generated in a case where the garbage collection is performed. In addition, the request charge amount (C) required for the garbage collection can be calculated by specifying the number of requests generated in a case where the garbage collection is performed and calculating the charge amount generated according to the number of requests.

Next, the backup generation management program 411 determines whether the capacity charge amount (A) that can be reduced in a case where the garbage collection is performed is larger than the transfer charge amount (B)+the request charge amount (C) required for the garbage collection (S9005).

When the capacity charge amount (A) that can be reduced in a case where the garbage collection is performed is not larger than the transfer charge amount (B)+the request charge amount (C) required for the garbage collection (S9005: No), it means that the total cost of the cloud storage 210 increases in a case where the garbage collection is performed, so that the backup generation management program 411 ends the backup generation management processing 9000.

On the other hand, in a case where the capacity charge amount (A) that can be reduced in a case where the garbage collection is performed is larger than the transfer charge amount (B)+the request charge amount (C) required for the garbage collection (S9005: Yes), the backup generation management program 411 performs a process (first process) of acquiring differential objects for M generations from the second oldest backup generation ((N+1)th generation) to the (M+1)th oldest backup generation ((N+M)th generation) from the cloud storage 210 (S9006).

Next, the backup generation management program determines whether the aggregation for all of the acquired one or more differential objects has ended (S9007). As a result, in a case where the aggregation of all the pieces of differential data of the M generations has been completed (S9007: Yes), the backup generation management program 411 advances the process to step S9010.

On the other hand, in a case where the aggregation of all the pieces of differential data of the M generations has not been completed (S9007: No), the backup generation management program 411 selects next partial differential data for which processing has not been completed from among the acquired differential data, and determines whether the partial differential data size is smaller than the minimum part size (S9008). Here, the partial differential data is data of a portion having a difference in the differential data, and the minimum part size is a minimum part size that can be transferred by the multipart upload API of the cloud storage 210.

In a case where the size of the partial differential data is not smaller than the minimum part size (S9008: No), since the partial differential data has a size that can be transferred by the multipart upload API, the backup generation management program 411 advances the process to step S9007. On the other hand, in a case where the size of the partial differential data is smaller than the minimum part size (S9008: Yes), the backup generation management program 411 acquires data before and after the partial differential data from the object of the first oldest backup generation such that the data including the partial differential data has the minimum part size, and advances the process to step S9007 (S9009).

In step S9010, the backup generation management program 411 executes a process (second process) of overwriting the aggregated differential data with the existing object of the oldest backup generation (Nth generation). Here, the backup generation management program 411 uses the multipart upload API provided by the cloud storage 210 to transfer only data of a part having differential data, and a part having no differential data remains as the original existing object. Specifically, for example, for a part having differential data, data may be transferred using the UploadPart API, and for a part having no differential data, copy from an existing object may be instructed using the UploadPartCopy API.

Next, the backup generation management program 411 executes a process (third process) of merging management files from the first oldest backup generation (Nth generation) to the (M+1)th oldest backup generation ((N+M)th generation) in the cloud storage 210 and associating the merged management file with an object of the first oldest backup generation (Nth generation) (S9011). For example, the backup generation management program 411 merges the management files from the first oldest generation to the (M+1)th oldest generation, and changes the name of the merged management file to the management file name of the first oldest backup generation (Nth generation). Note that, in a case where the name of the object cannot be directly changed in the cloud storage 210, the contents of a management file obtained by merging management files from the first oldest generation to the (M+1)th oldest generation may be transferred as an object having a management file name of the first oldest generation (Nth generation).

Next, the backup generation management program 411 executes a process (fourth process) of deleting the management files of the second oldest generation ((N+1)th generation) to the (M+1)th oldest generation ((N+M)th generation) and the differential object from the cloud storage 210 (S9012), and ends the backup generation management processing 9000.

According to the backup generation management processing 9000 described above, in a case where the capacity charge amount (A) that can be reduced in a case where the garbage collection is performed is larger than the transfer charge amount (B)+the request charge amount (C) required for the garbage collection, the cost of the cloud system 20 can be suppressed by performing the garbage collection.

Next, backup generation designation deletion processing 12000 in the computer system 1 according to the first embodiment will be described.

Figure 13:
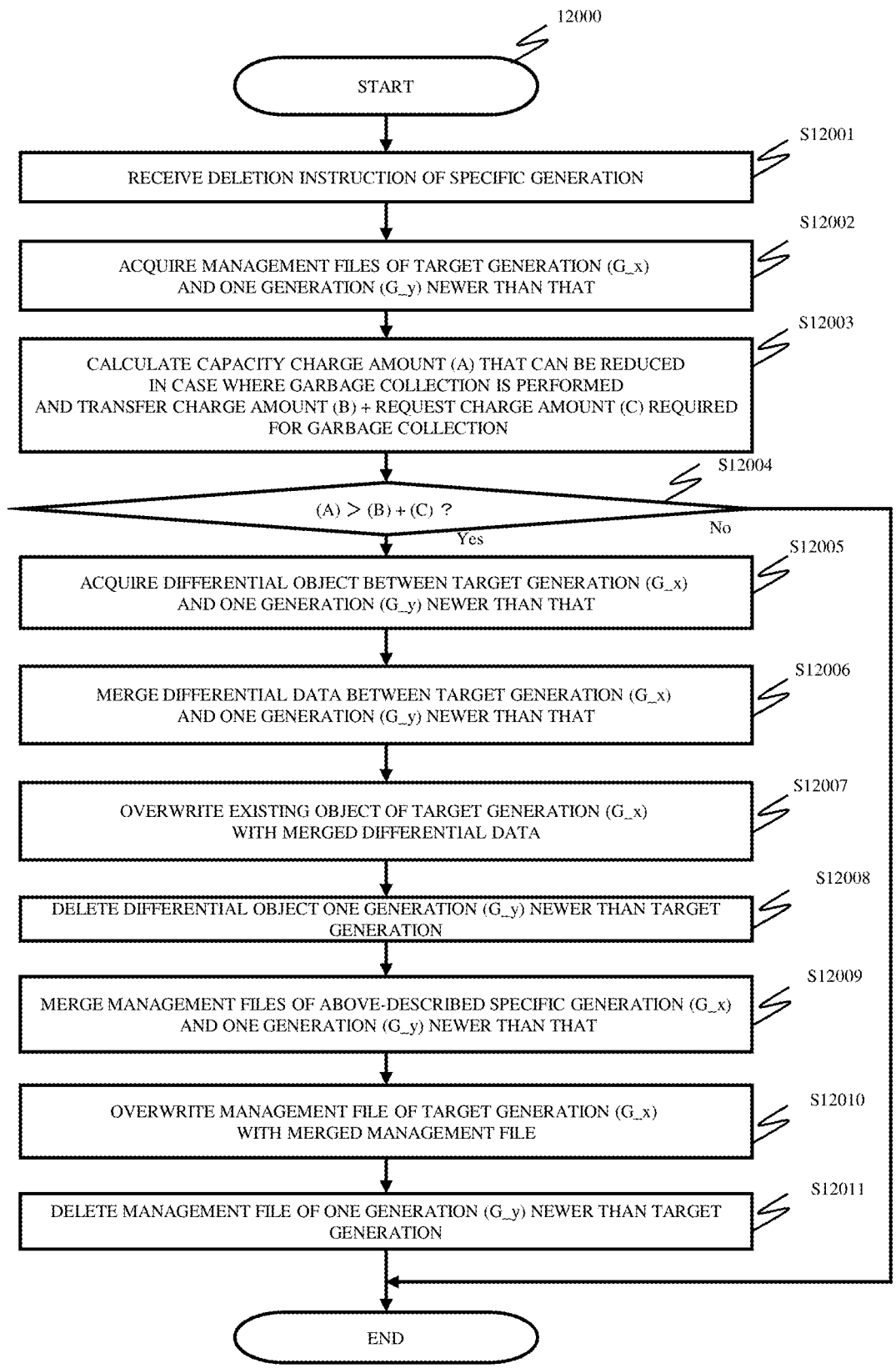
FIG. 13 is a flowchart of backup generation designation deletion processing according to the first embodiment.

FIG. 13 is a flowchart of the backup generation designation deletion processing according to the first embodiment. The backup generation designation deletion processing 12000 is a process of deleting object data of a specific one generation among the object data of the cloud storage 210 (generation deletion processing).

The backup generation designation deletion processing 12000 is executed periodically by a backup generation management program of the SmartNIC 40 or by an instruction of an administrator.

The backup generation management program 411 receives a deletion instruction of a specific backup generation (target backup generation) (S12001). For example, the storage management system 200 of the cloud system 20 may receive a deletion instruction of a specific backup generation from the administrator and transfer the received instruction to the backup generation management program 411 of the SmartNIC 40, and the backup generation management program 411 may receive the transferred deletion instruction.

In addition, in a case where there is a backup generation that periodically satisfies a predetermined condition, the backup generation management program 411 may receive the backup generation as a deletion instruction for this generation. For example, in a case where the storage management system 200 is set to retain the daily backup for 7 generations and the weekly backup for 5 generations, a deletion instruction to delete the daily backup generation whose retention period has passed 7 days may be received, and a deletion instruction to delete the weekly backup generation whose retention period has passed 5 weeks may be received. In this case, the backup generation to be deleted is not necessarily the first oldest generation.

Next, the backup generation management program 411 acquires, from the cloud storage 210, management files of the target backup generation (G_x) (Nth generation) and a backup generation (G_y) ((N+1)th generation) that is one generation newer than the target backup generation (G_x) (Nth generation) (S12002).

Next, based on the acquired management file and the storage charging table 500, the backup generation management program 411 calculates a capacity charge amount (A) that can be reduced in a case where the garbage collection is performed and a transfer charge amount (B)+a request charge amount (C) required for the garbage collection (S12003). Here, the capacity charge amount (A) that can be reduced in a case where the garbage collation is performed can be calculated by specifying the differential data amount for the target backup generations from the acquired management files and calculating the reduction amount of the capacity charge amount in a case where the differential data amount is reduced based on the storage charging table 500. In addition, the transfer charge amount (B) required for the garbage collection can be calculated by calculating a charge amount generated according to a transfer amount generated in a case where the garbage collection is performed. In addition, the request charge amount (C) required for the garbage collection can be calculated by specifying the number of requests generated in a case where the garbage collection is performed and calculating the charge amount generated according to the number of requests.

Next, the backup generation management program 411 determines whether the capacity charge amount (A) that can be reduced in a case where the garbage collection is performed is larger than the transfer charge amount (B)+the request charge amount (C) required for the garbage collection (S12004).

When the capacity charge amount (A) that can be reduced in a case where the garbage collection is performed is not larger than the transfer charge amount (B)+the request charge amount (C) required for the garbage collection (S12004: No), it means that the total cost of the cloud storage 210 increases in a case where the garbage collection is performed, so that the backup generation management program 411 ends the backup generation designation deletion processing 12000.

On the other hand, in a case where the capacity charge amount (A) that can be reduced in a case where garbage collection is performed is larger than the transfer charge amount (B)+the request charge amount (C) required for the garbage collection (S12004: Yes), the backup generation management program 411 performs a process (first process) of acquiring a differential object between the target backup generation (G_x) (Nth generation) and a backup generation (G_y) ((N+M)th generation) that is one generation newer than the target backup generation (G_x) (Nth generation) from the cloud storage 210 (S12005).

Next, the backup generation management program 411 creates differential data obtained by merging the differential data between the target backup generation (G_x) (Nth generation) and the backup generation (G_y) ((N+M)th generation) that is one generation newer than the target backup generation (G_x) (Nth generation) into one (S12006).

Next, the backup generation management program 411 executes a process (second process) of overwriting the merged differential data on the existing object of the target backup generation (G_x) (Nth generation) (S12007).

Next, the backup generation management program 411 executes a process (part of the fourth process) of deleting, from the cloud storage 210, a differential object of a generation (G_y) ((N+M)th generation) that is one generation newer than the target backup generation (S12008).

Next, the backup generation management program 411 executes a process (third process) of creating a management file in which management files of the target backup generation (G_x) (Nth generation) and a backup generation (G_y)

((N+M)th generation) that is one generation newer than the target backup generation (G_x) (Nth generation) are merged (S12009). For example, in a case where a differential bitmap indicating the presence or absence of a difference in the management file by a bit is managed, the backup generation management program 411 merges the management file by performing an OR operation of the differential bitmap of the target backup generation (G_x) (Nth generation) and the differential bitmap of the backup generation (G_y) ((N+M)th generation) that is one generation newer than the target backup generation (G_x) (Nth generation).

Next, the backup generation management program 411 overwrites the created management file with the management file of the target backup generation (G_x) (Nth generation) (S12010).

Next, the backup generation management program 411 executes a process (part of the fourth process) of deleting the management file of the backup generation (G_y) ((N+M)th generation) that is one generation newer than the target backup generation (12011), and ends the backup generation designation deletion processing 12000.

In the backup generation designation deletion processing illustrated in FIG. 13, an example of the process for one backup generation is illustrated with the number M of generations to be deleted being 1, but a process of collectively deleting a plurality of backup generations may be executed in a case where M is 2 or more. In addition, the order of each step of the backup generation designation deletion processing 12000 illustrated in FIG. 13 is not limited thereto, and the order may be changed for steps that do not cause a problem even if the order is changed. For example, the process of step S12008 may be collectively executed in step S12011.

Second Embodiment

Next, a computer system 1A according to a second embodiment will be described.

Figure 14:
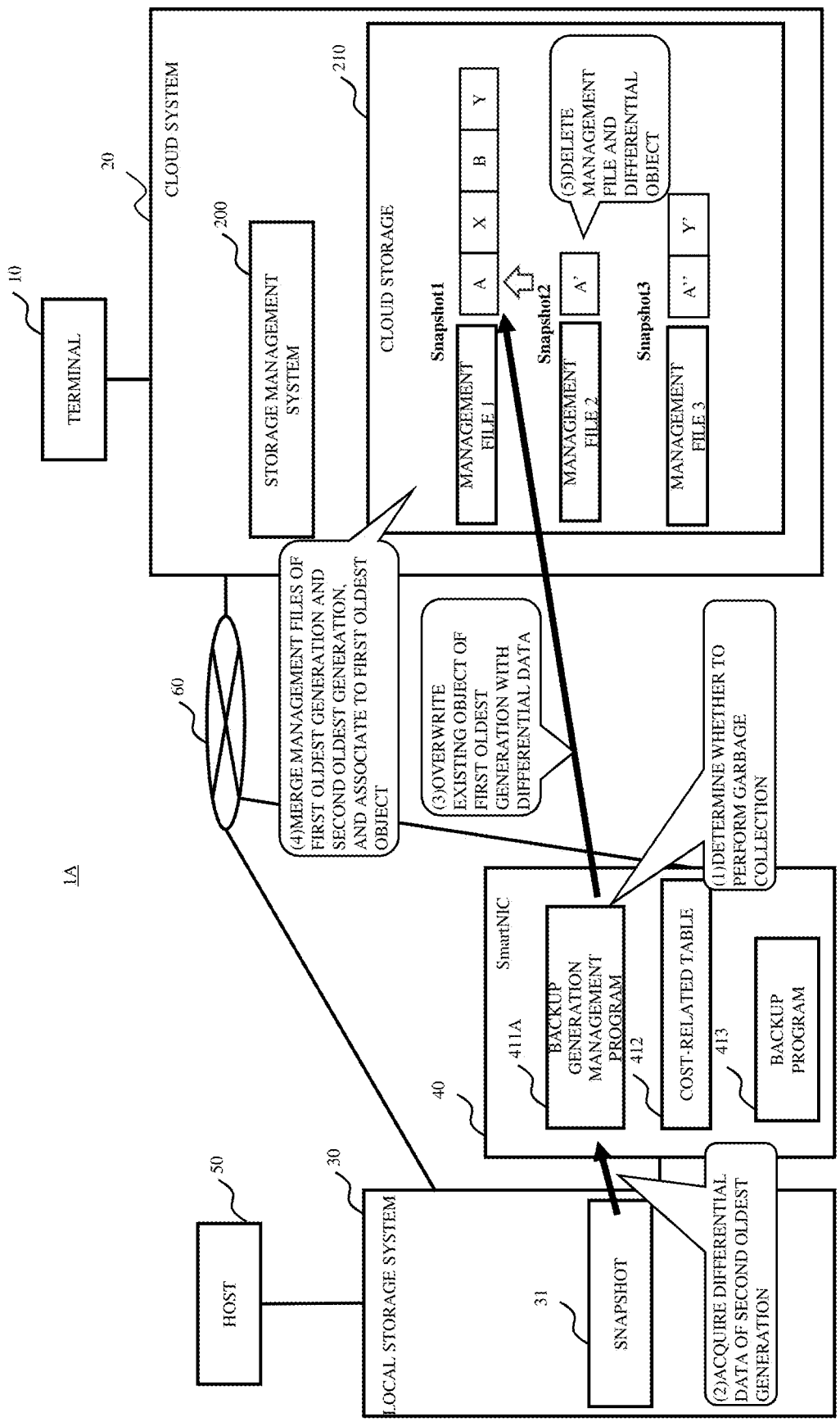
FIG. 14 is a configuration diagram of a computer system according to a second embodiment.

FIG. 14 is a configuration diagram of a computer system according to the second embodiment. Note that the same components as those of the computer system of the first embodiment are denoted by the same reference numerals.

The second embodiment is different from the first embodiment in that differential data to be overwritten on an existing object of the first oldest generation is acquired from a snapshot of the local storage system 30 in the garbage collection processing. In the computer system 1A of the second embodiment, when deleting the backup generation exceeding the upper limit value of the retention number of the backup generations, a backup generation management program 411A of the SmartNIC 40 connected to the local storage system 30 acquires differential data from the second oldest generation ((N+1)th generation) to the (M+1)th oldest generation ((N+M)th generation) from the snapshot of the local storage system 30. In addition, the local storage system 30 retains the snapshot 31 of the backup generations in the cloud storage 210.

The computer system 1A according to the second embodiment is different from the processing ((2) in FIG. 1) of the computer system 1 according to the first embodiment illustrated in FIG. 1 in a part of processing ((2) in FIG. 14). Specifically, the backup generation management program 411A of the SmartNIC 40 of the second embodiment acquires differential data of the second oldest generation from the snapshot 31 of the local storage system 30 and executes the processing. As described above, by acquiring the differential data of the second oldest generation ((N+1)th generation) from the local storage system 30, there is no transfer amount charging for that amount, so that the cost of the cloud system 20 can be reduced in the generation management processing of the backup in the cloud system 20.

Next, backup generation management processing 10000 in the computer system 1A according to the second embodiment will be described.

Figure 15:
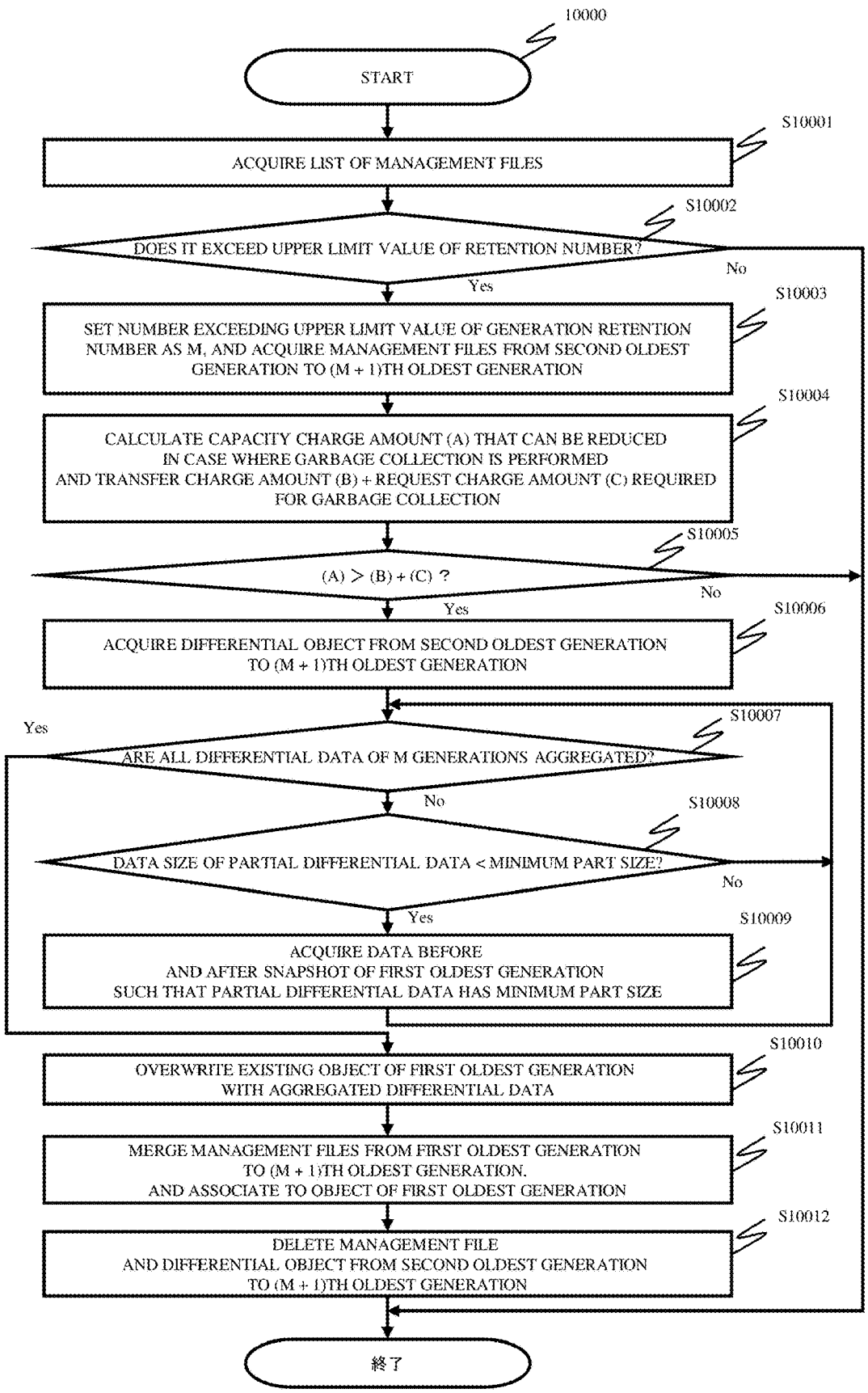
FIG. 15 is a flowchart of backup generation management processing according to the second embodiment.

FIG. 15 is a flowchart of backup generation management processing according to the second embodiment. The backup generation management processing 10000 is a process of deleting object data of the oldest M generations (M is an integer of 1 or more) among the object data in the object data in the cloud storage 210.

The backup generation management processing 9000 is executed by the backup generation management program 411A of the SmartNIC 40 periodically or by an instruction of an administrator.

The process in steps S10001 to S10005 is the same as the process in steps S9001 to S9005 in FIG. 12.

In a case where the capacity charge amount (A) that can be reduced in a case where the garbage collection is performed is larger than the transfer charge amount (B)+the request charge amount (C) required for the garbage collection (S10005: Yes), the backup generation management program 411A performs a process (first process) of acquiring a snapshot from the cloud storage 210 as differential data for M generations from the second oldest backup generation ((N+1)th generation) to the (M+1)th oldest backup generation ((N+M)th generation) (S10006).

Next, the backup generation management program 411A determines whether the aggregation of all of the acquired one or more snapshots (differential data) has ended (S10007). As a result, in a case where the aggregation of all the pieces of differential data of the M generations has been completed (S10007: Yes), the backup generation management program 411A advances the process to step S10010.

On the other hand, in a case where the aggregation of all the pieces of differential data of the M generations has not been completed (S10007: No), the backup generation management program 411A selects next partial differential data for which processing has not been completed from among the acquired differential data, and determines whether the partial differential data size is smaller than the minimum part size (S10008). Here, the partial differential data is data of a portion having a difference in the differential data, and the minimum part size is a minimum part size that can be transferred by the multipart upload API of the cloud storage 210.

In a case where the size of the partial differential data is not smaller than the minimum part size (S10008: No), since the partial differential data has a size that can be transferred by the multipart upload API, the backup generation management program 411A advances the process to step S10007. On the other hand, in a case where the size of the partial differential data is smaller than the minimum part size (S10008: Yes), the backup generation management program 411A acquires data before and after the partial differential data from the snapshot of the first oldest backup generation such that the data including the partial differential data has the minimum part size, and advances the process to step S10007 (S10009).

The process in steps S10010 to S10012 is the same as the process in steps S9010 to S9012 in FIG. 12.

In the computer system 1A according to the above-described embodiment, the snapshot backed up in the cloud storage 210 is left in the local storage system 30, but the snapshot of the local storage system 30 may be deleted at any timing. For example, the backup generation management program 411A may delete a snapshot of the first oldest generation from the local storage system 30 after the end of the backup generation management processing 10000.

Third Embodiment

Next, a computer system 1B according to a third embodiment will be described.

Figure 16:
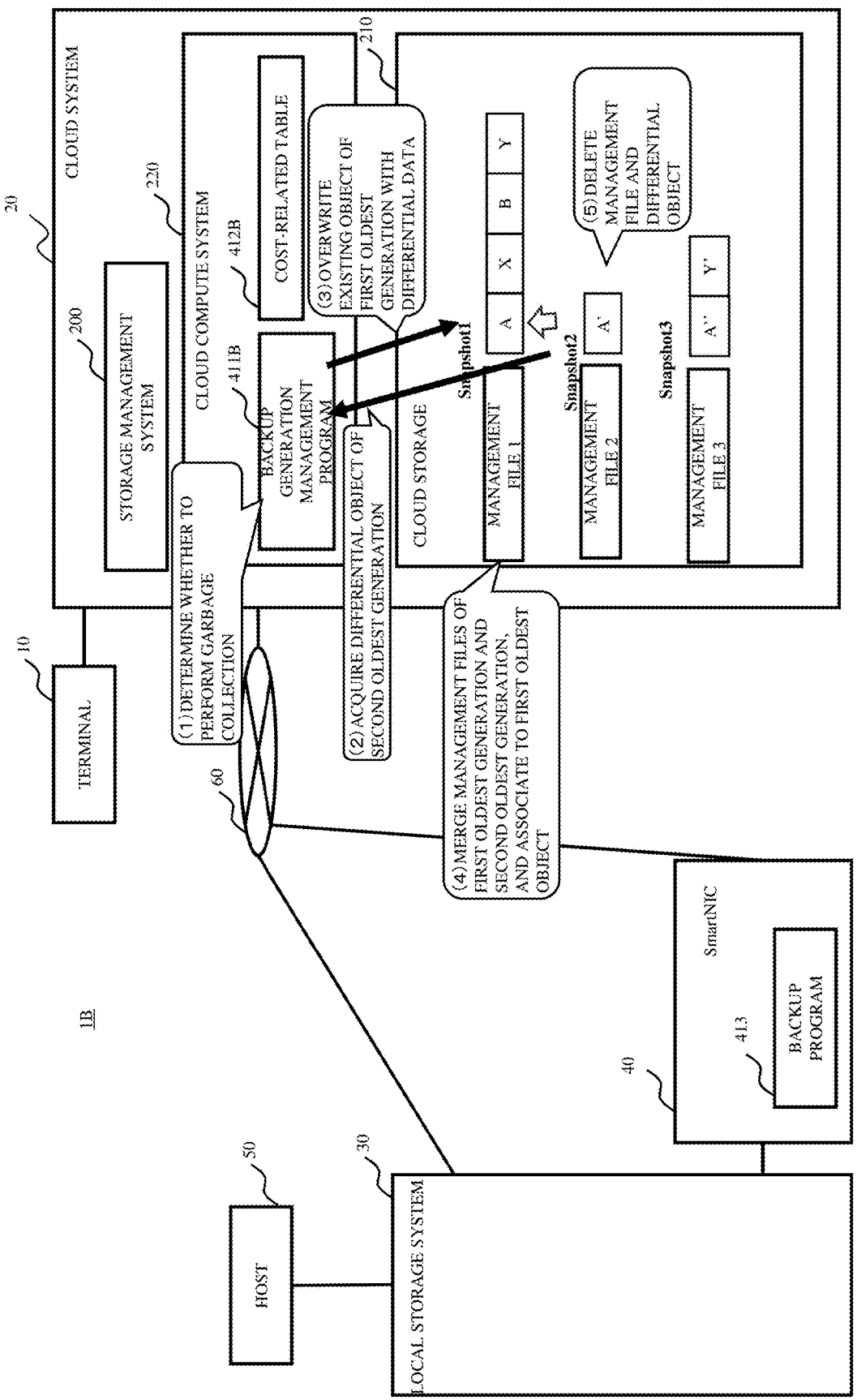
FIG. 16 is a configuration diagram of a computer system according to a third embodiment.

FIG. 16 is a configuration diagram of a computer system according to the third embodiment. Note that the same components as those of the computer system of the first embodiment are denoted by the same reference numerals.

The third embodiment is different from the first embodiment and the second embodiment in that the generation management of the backup is executed by the cloud system 20.

In the computer system 1B of the third embodiment, a backup generation management program 411B of the cloud compute system 220 of the cloud system 20 manages the generation of the backup transferred to the cloud storage 210. The cloud compute system 220 includes virtual machine, container, or serverless. In a case where the cloud compute system 220 is a virtual machine, for example, the virtual machine is periodically activated to execute the backup generation management program 411B. In addition, in a case where the cloud compute system 220 is a container, for example, the container is periodically activated to execute the backup generation management program 411B. In addition, in a case where the cloud compute system 220 is serverless, for example, the backup generation management program 411B is executed with storage of an object in the cloud storage 210 as a trigger.

The cloud system 20 of the computer system 1B includes the cloud compute system 220. The cloud compute system 220 stores a backup generation management program 411B and a cost-related table 412B. The cost-related table 412B has the same configuration as the cost-related table 412. The backup generation management program 411B has some functions different from those of the backup generation management program 411. Hereinafter, different functions will be mainly described. Since the backup generation management program 411B closes the generation management of the backup in the cloud system 20, there is no transfer amount charging in the cloud system 20, but there is a charge for computation since the backup generation management program 411B is executed in the cloud compute system 220.

Next, backup generation management processing 11000 in the computer system 1B according to the third embodiment will be described.

Figure 17:
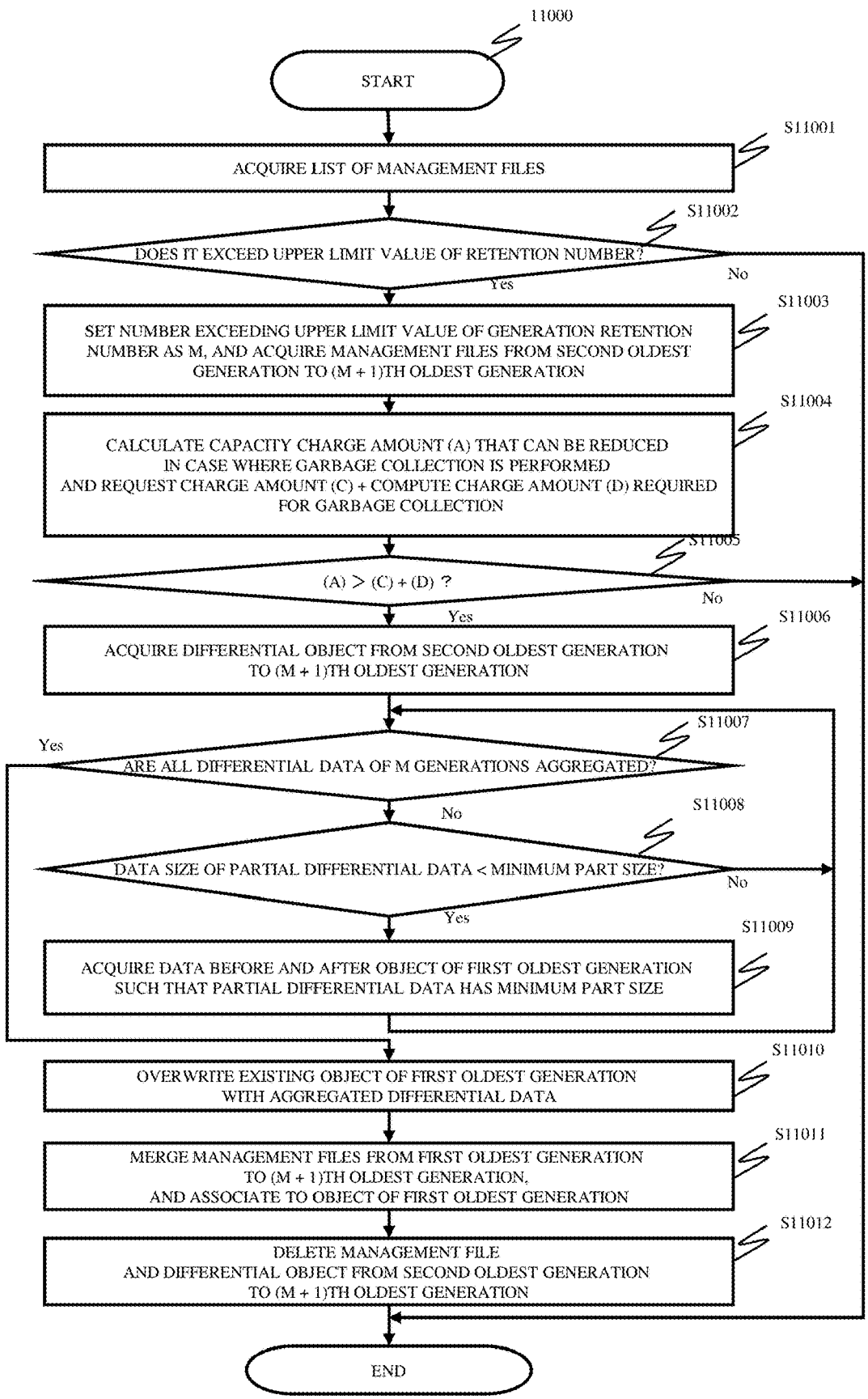
FIG. 17 is a flowchart of backup generation management processing according to the third embodiment.

FIG. 17 is a flowchart of backup generation management processing according to the third embodiment. The backup generation management processing 11000 is a process of deleting object data of the oldest M generations (M is an integer of 1 or more) among the object data in the object data in the cloud storage 210.

The backup generation management processing 11000 is executed by the backup generation management program 411B of the cloud compute system 220 periodically or by an instruction of an administrator.

The process in steps S11001 to S11003 is the same as the process in steps S9001 to S9003 in FIG. 12.

In step S11004, the backup generation management program 411B calculates a capacity charge amount (A) that can be reduced in a case where the garbage collection is performed and a request charge amount (C) and a compute charge amount (D) required for the garbage collection on the basis of the acquired management file, the storage charging table 500, and the compute system charging table 600. Here, the capacity charge amount (A) that can be reduced in a case where the garbage collation is performed can be calculated by specifying the differential data amount for the backup generations exceeding the upper limit value of the generation retention number from the acquired management files and calculating the reduction amount of the capacity charge amount in a case where the differential data amount is reduced based on the storage charging table 500. In addition, the request charge amount (C) required for the garbage collection can be calculated by specifying the number of requests generated in a case where the garbage collection is performed and calculating the charge amount generated according to the number of requests on the basis of the storage charging table 500. In addition, the compute charge amount (D) required for the garbage collection can be calculated by calculating a charge amount generated according to a compute generated in a case where the garbage collection is performed on the basis of the compute system charging table 600.

Next, the backup generation management program 411B determines whether the capacity charge amount (A) that can be reduced in a case where the garbage collection is performed is larger than the request charge amount (C)+the compute charge amount (D) required for the garbage collection (S11005).

When the capacity charge amount (A) that can be reduced in a case where the garbage collection is performed is not larger than the request charge amount (C)+the compute charge amount (D) required for the garbage collection (S11005: No), it means that the total cost of the cloud storage 210 increases in a case where the garbage collection is performed, so that the backup generation management program 411B ends the backup generation management processing 11000.

On the other hand, in a case where the capacity charge amount (A) that can be reduced in a case where the garbage collection is performed is larger than the request charge amount (C)+compute charge amount (D) required for the garbage collection (S11005: Yes), the backup generation management program 411B performs a process (first process) of acquiring differential objects for M generations from the second oldest backup generation ((N+1)th generation) to the (M+1)th oldest backup generation ((N+M)th generation) from the cloud storage 210 (S11006).

Subsequent steps S11007 to S11012 are similar to the process of steps S9007 to S9012 in FIG. 12.

Fourth Embodiment

Next, a computer system according to a fourth embodiment will be described.

In the computer systems according to the first to third embodiments, an example of deleting in order from the oldest backup generation has been described. However, in a case where the condition that the capacity charge amount, reducible in a case where the garbage collection is performed, is larger than the charge amount for the garbage collection processing is satisfied, the effect can be obtained even if the generation that is not the oldest generation is deleted. Therefore, the computer system according to the fourth embodiment is different from the first to third embodiments in that the computer system does not necessary to delete a generation in order from the oldest generation. In the computer system according to the fourth embodiment, for example, the backup generation management programs 411, 411A, and 411B delete arbitrary consecutive M generations.

Next, backup generation management processing 19000 in the computer system according to the fourth embodiment will be described.

Figure 18:
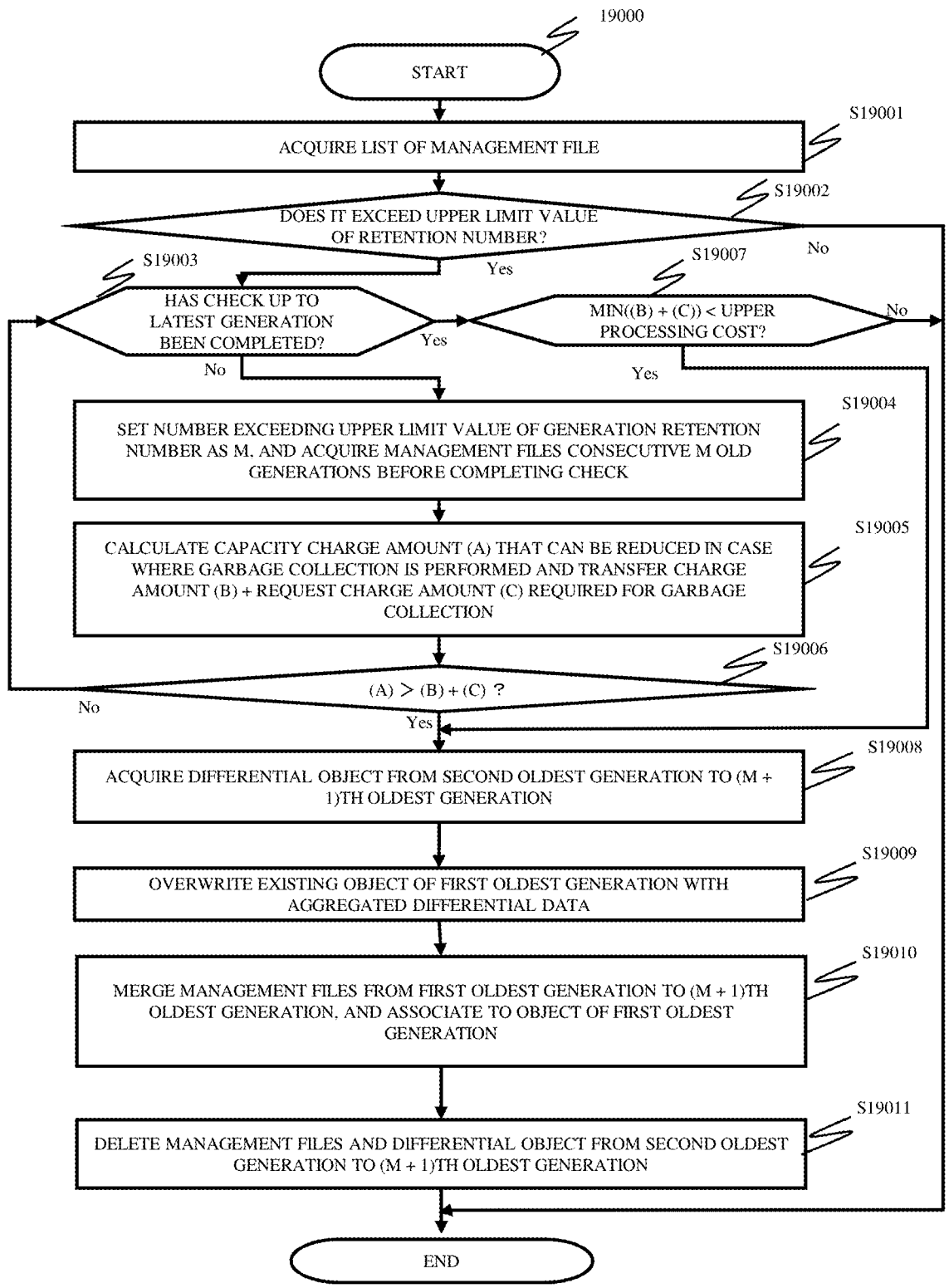
FIG. 18 is a flowchart of backup generation management processing according to a fourth embodiment.

FIG. 18 is a flowchart of backup generation management processing according to the fourth embodiment. The backup generation management processing 19000 is a process of deleting object data of arbitrary M generations (M is an integer of 1 or more) among the object data in the object data in the cloud storage 210.

The backup generation management processing 19000 is executed periodically by the backup generation management program 411 or 411A of the SmartNIC 40 or by the backup generation management program 411B of the cloud compute system 220, or by an instruction of an administrator.

The process in steps S19001 to S19002 is the same as the process in steps S9001 to S9002 in FIG. 12.

In a case where the generation retention number does not exceed the upper limit value of the retention number (S19002: No), it is not necessary to delete the backup generation, and thus, the backup generation management program ends the backup generation management processing 19000.

On the other hand, in a case where the generation retention number exceeds the upper limit value of the retention number (S19002: Yes), the backup generation management program determines whether the check as to whether the condition of step S19006 is satisfied in all patterns from the old generation to the latest generation has been completed (S19003). As a result, in a case where the check has been completed up to the latest generation (S19003: Yes), the backup generation management program causes the process to proceed to step S19007.

On the other hand, in a case where the check has not been completed up to the latest generation (S19003; No), the backup generation management program sets the number exceeding the upper limit value of the generation retention number as M, and acquires, from the cloud storage 210, management files of consecutive old M generations before completing the check as to whether the condition of step S19006 is satisfied (S19004). For example, in the case of M=2, management files of the second oldest generation and the third oldest generation are acquired in the first step S19004, and management files of the third oldest generation and the fourth oldest generation are acquired in the second step S19004. Note that the backup generation management program may store the acquired management file on a device (SmartNIC 40 or cloud compute system 220) executing the backup generation management program, and acquire and use the stored management file.

Next, the backup generation management program calculates a capacity charge amount (A) that can be reduced in a case where the garbage collection is performed and a transfer charge amount (B)+a request charge amount (C) required for the garbage collection based on the acquired management file and the storage charging table 500 (S19005). Here, the capacity charge amount (A) that can be reduced in a case where the garbage collation is performed can be calculated by specifying the differential data amount for the backup generations exceeding the upper limit value of the generation retention number from the acquired management files and calculating the reduction amount of the capacity charge amount in a case where the differential data amount is reduced based on the storage charging table 500. In addition, the transfer charge amount (B) required for the garbage collection can be calculated by calculating a charge amount generated according to a transfer amount generated in a case where the garbage collection is performed. In addition, the request charge amount (C) required for the garbage collection can be calculated by specifying the number of requests generated in a case where the garbage collection is performed and calculating the charge amount generated according to the number of requests.

In a case where the capacity charge amount (A) that can be reduced in a case where the garbage collection is performed is larger than the transfer charge amount (B)+the request charge amount (C) required for the garbage collection (S19006: Yes), the backup generation management program causes the process to proceed to step S19008.

On the other hand, in a case where the capacity charge amount (A) that can be reduced in a case where the garbage collection is performed is not larger than the transfer charge amount (B)+the request charge amount (C) required for the garbage collection (S19006: No), the backup generation management program causes the process to proceed to step S19003.

In step S19007, the backup generation management program determines whether the minimum value of the transfer charge amount (B)+the request charge amount (C) required for the garbage collection is smaller than the set upper limit processing cost in any consecutive M generations. Here, for example, the storage management system 200 may receive a setting of the upper limit processing cost from the administrator, and the storage management system 200 may reflect the setting value in the backup generation management program.

As a result, in any consecutive M generations, in a case where the minimum value of the transfer charge amount (B)+the request charge amount (C) required for the garbage collection is not smaller than the upper limit processing cost (S19007: No), the backup generation management program ends the backup generation management processing 19000.

On the other hand, in a case where the minimum value of the transfer charge amount (B)+request charge amount (C) required for the garbage collection is smaller than the upper limit processing cost (S19007: Yes), the backup generation management program causes the process to proceed to step S19008. As a result, in a case where the minimum value is smaller than the upper limit processing cost, the management files and the differential objects of the M generations are deleted.

The subsequent process in steps S19008 to S19011 is similar to the process in steps S9006 and S9010 to S9012 in FIG. 12. The first oldest generation and the second oldest generation in steps S19008 to S19011 are generations in consecutive M generations to be deleted.

In the backup generation management processing illustrated in FIG. 18, an example in which consecutive M generations are deleted has been described. However, the M generations are not necessarily consecutive, and arbitrary M generations may be deleted. For example, M older generations may be selected and deleted among the even (or odd) generation numbers, or M older generations may be selected and deleted in the order of the generation with a larger (or smaller) differential data amount. At this time, in a case where the selected M generations are not continuous, the differential data may be merged into the existing object of the previous generation for each of the consecutive generation portions. For example, in a case where 1, 2, . . . , 9, and 10 generations are backed up in chronological order and M=4, the second generation and the third generation may be merged into the first generation, and the fifth generation and the sixth generation may be merged into the fourth generation.

Fifth Embodiment

Next, a computer system according to a fifth embodiment will be described.

In the computer systems according to the first to fourth embodiments, an example in which M generations whose backup generation number exceeds the upper limit value of the set retention number are deleted has been described, but the computer system according to the fifth embodiment is different in that the M−L generations are deleted. Here, L is 0, 1, 2, . . . , M−1. In a case where the condition that the capacity charge amount, reducible in a case where the garbage collection is performed, is larger than the charge amount related to the garbage collection processing is satisfied, the M−L generations may be deleted instead of the M generations, and in this case, the cost reduction effect can be obtained.

Next, backup generation management processing 20000 in the computer system according to the fifth embodiment will be described.

Figure 19:
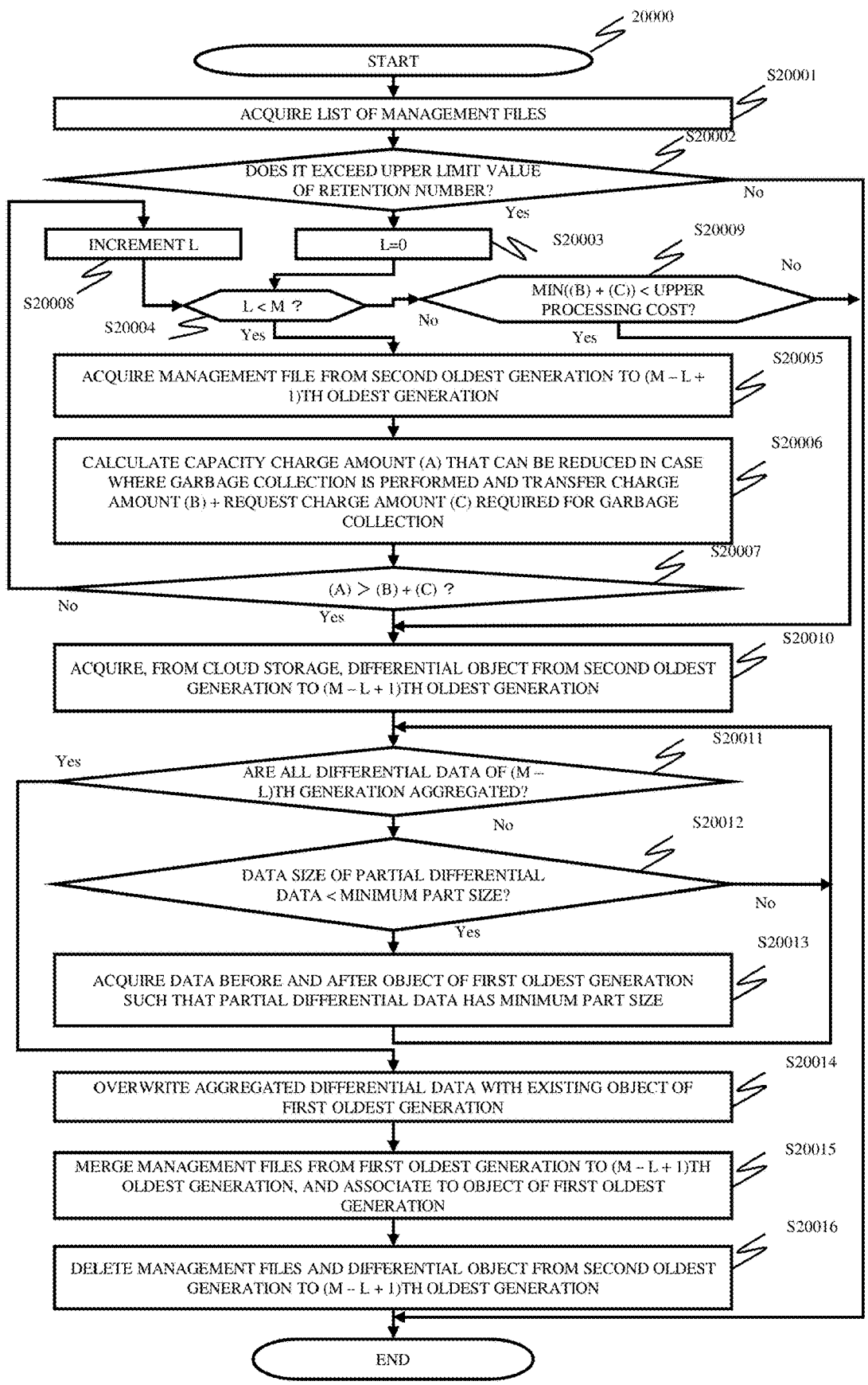
FIG. 19 is a flowchart of backup generation management processing according to a fifth embodiment.

FIG. 19 is a flowchart of backup generation management processing according to the fifth embodiment. The backup generation management processing 20000 is a process of deleting object data of M−L generations (M is an integer of 1 or more) among the object data in the object data in the cloud storage 210.

The backup generation management processing 20000 is executed periodically by the backup generation management program 411 or 411A of the SmartNIC 40 or by the backup generation management program 411B of the cloud compute system 220, or by an instruction of an administrator.

The process in steps S20001 to S20002 is the same as the process in steps S9001 to S9002 in FIG. 12.

In a case where the generation retention number does not exceed the upper limit value of the retention number (S20002: No), it is not necessary to delete the backup generation, and thus, the backup generation management program ends the backup generation management processing 19000.

On the other hand, in a case where the generation retention number exceeds the upper limit value of the retention number (S20002: Yes), the backup generation management program initializes (sets to 0) the variable L that determines the number of generations to be deleted (S20003).

Next, the backup generation management program sets the number exceeding the upper limit of the generation retention number as M, and determines whether L is smaller than M (S20004). As a result, in a case where L is not smaller than M (S20004: No), the backup generation management program causes the process to proceed to step S20009.

On the other hand, when L is smaller than M (S20004: Yes), the backup generation management program acquires (M−L) generation management files from the second oldest generation to the (M−L+1)th oldest generation (S20005). For example, in the case of M=3 and L=1, the backup generation management program acquires management files of the second oldest generation and the third oldest generation. Note that the backup generation management program may store the acquired management file on a device (SmartNIC 40 or cloud compute system 220) executing the backup generation management program, and acquire and use the stored management file.

Next, the backup generation management program calculates a capacity charge amount (A) that can be reduced in a case where the garbage collection is performed and a transfer charge amount (B)+a request charge amount (C) required for the garbage collection based on the acquired management file and the storage charging table 500 (S20006). Here, the capacity charge amount (A) that can be reduced in a case where the garbage collation is performed can be calculated by specifying the differential data amount for the (M−L) generations from the acquired management files and calculating the reduction amount of the capacity charge amount in a case where the differential data amount is reduced based on the storage charging table 500. In addition, the transfer charge amount (B) required for the garbage collection can be calculated by calculating a charge amount generated according to a transfer amount generated in a case where the garbage collection is performed. In addition, the request charge amount (C) required for the garbage collection can be calculated by specifying the number of requests generated in a case where the garbage collection is performed and calculating the charge amount generated according to the number of requests.

In a case where the capacity charge amount (A) that can be reduced in a case where the garbage collection is performed is larger than the transfer charge amount (B)+the request charge amount (C) required for the garbage collection (S20007: Yes), the backup generation management program causes the process to proceed to step S20010.

On the other hand, in a case where the capacity charge amount (A) that can be reduced in a case where the garbage collection is performed is not larger than the transfer charge amount (B)+the request charge amount (C) required for the garbage collection (S20007: No), the backup generation management program increments the variable L by (+1) (S20008), and the process proceeds to step S20004.

In step S20009, the backup generation management program determines whether the minimum value of the transfer charge amount (B)+the request charge amount (C) required for the garbage collection is smaller than the set upper limit processing cost in arbitrary (M−L) generations (here, L is 0 to M−1). Here, for example, the storage management system 200 may receive a setting of the upper limit processing cost from the administrator, and the storage management system 200 may reflect the setting value in the backup generation management program.

As a result, in the (M−L) generations, in a case where the minimum value of the transfer charge amount (B)+the request charge amount (C) required for the garbage collection is not smaller than the upper limit processing cost (S20009: No), the backup generation management program ends the backup generation management processing 20000.

On the other hand, in a case where the minimum value of the transfer charge amount (B)+request charge amount (C) required for the garbage collection is smaller than the upper limit processing cost (S20009: Yes), the backup generation management program causes the process to proceed to step S20010.

The subsequent process in steps S20010 to S20016 is similar to the process in steps S9006 to S9012 in FIG. 12. The first oldest generation and the second oldest generation in steps S20014 to S20016 are generations in the (M−L) generations to be deleted. Note that, although the process of merging into the first oldest generation with N=1 has been described here, N≥2 may be satisfied. In this case, data obtained by aggregating differential data between the Nth generation and the M generations (sorting the data by addresses from the head and pre-filling the data) is overwritten on the existing object of the Nth generation.

Although some embodiments have been described above, the present invention is not limited to these embodiments, and it goes without saying that various modifications can be made without departing from the gist of the present invention.

What is claimed is:

1. A computer system comprising:
a cloud system that provides a cloud storage;
a local storage system that is connected to the cloud system via a network; and
a backup function unit that backs up snapshot data of the local storage system as backup data to the cloud storage, wherein
the cloud storage includes the backup data and a management file associated with each of the backup data,
the computer system comprises a management function unit that manages the backup data stored in the cloud storage and the management file for each generation,
the management function unit compares a load cost applied to generation deletion processing with a reduction cost reduced by the generation deletion processing, and executes the generation deletion processing in a case where the reduction cost is larger than the load cost,
the generation deletion processing is a process of deleting backup data and a management file of predetermined M generations (M is an integer of 1 or more), and includes a first process, a second process, a third process, and a fourth process,
the first process is a process of acquiring differential data of backup data of M generations from an (N+1)th generation to an (N+M)th generation, which is one generation newer than a predetermined Nth generation (N is an integer of 1 or more),
the second process is a process of storing the differential data in the cloud storage and overwriting a backup data of an Nth generation in the cloud storage,
the third process is a process of merging from the management file of the Nth generation associated with the backup data of the Nth generation to a management file of the (N+M)th generation associated with backup data of the (N+M)th generation in the cloud storage and associating the management file with the backup data of the Nth generation, and
the fourth process is a process of deleting backup data and management files of the (N+1)th generation to the (N+M)th generation in the cloud storage.

2. The computer system according to claim 1, wherein the Nth generation is an oldest generation of backup data of the cloud storage.

3. The computer system according to claim 1, wherein the M is 1.

4. The computer system according to claim 1, wherein the management function unit is included in the local storage system.

5. The computer system according to claim 1, wherein the management function unit is included in the cloud system.

6. The computer system according to claim 1, wherein the management function unit acquires the differential data from the cloud storage in the first process.

7. The computer system according to claim 1, wherein the management function unit acquires the differential data from the local storage system in the first process.

8. The computer system according to claim 1, wherein
the load cost is a load charge amount related to reading and writing from and to the cloud storage, and
the reduction cost is a reduced charge amount related to a data amount to be reduced from the cloud storage.

9. The computer system according to claim 8, wherein
the load charge amount is a total amount of a transfer charge amount related to a data amount read from or written to the cloud storage related to the generation deletion processing and a request charge amount related to a request for the cloud storage related to the generation deletion processing.

10. The computer system according to claim 4, wherein
the backup data and the management file are divided into a plurality of parts and managed,
the management file includes, for each of the plurality of parts, data indicating presence or absence of a difference between backup data associated with the management file and backup data older than the backup data by one generation,
the cloud system includes a first function and a second function as functions of storing data in each of the parts of the backup data,
the first function is a function of storing data acquired from an outside of the cloud storage in the part of the backup data,
the second function is a function of copying data of the cloud storage and storing the data in the part of the backup data, and
the management function unit is configured to:
in the second process,
instruct the cloud system to execute the first function for a part having a difference among the plurality of parts of the management file, and
instruct the cloud system to execute the second function for a part having no difference among the plurality of parts of the management file.

11. The computer system according to claim 1, wherein
the management function unit is configured to:
in a case where the reduction cost is not larger than the load cost,
increase a value of N to search for a case where the reduction cost is larger than the load cost.

12. The computer system according to claim 11, wherein
an upper limit processing cost for the generation deletion processing is set, and
the management function unit is configured to:
in a case where the reduction cost does not become larger than the load cost even if a value of the N is increased,
perform the generation deletion processing on the N in which the load cost becomes smaller than the upper limit processing cost.

13. The computer system according to claim 1, wherein
the management function unit is configured to:
in a case where the reduction cost is not larger than the load cost,
reduce a number of generations to be deleted in the generation deletion processing to search for a case where the reduction cost is larger than the load cost.

14. The computer system according to claim 13, wherein
an upper limit processing cost for the generation deletion processing is set, and
the management function unit is configured to:
in a case where the reduction cost does not become larger than the load cost even if a number of generations to be deleted in the generation deletion processing is reduced, perform the generation deletion processing on generations of a number of generations in which the load cost becomes smaller than the upper limit processing cost.

15. A backup management method by a computer system including a cloud system that provides a cloud storage and a local storage system that is connected to the cloud system via a network, the backup management method comprising:

backing up, by the computer system, the snapshot data of the local storage system as backup data in the cloud storage, wherein the cloud storage includes the backup data and a management file associated with each of the backup data;

managing, by the computer system, the backup data and the management file stored in the cloud storage for each generation; and comparing a load cost applied to generation deletion processing with a reduction cost to be reduced by the generation deletion processing, and executing the generation deletion processing in a case where the reduction cost is larger than the load cost, wherein the generation deletion processing is a process of deleting backup data and a management file of predetermined M generations (M is an integer of 1 or more), and includes a first process, a second process, a third process, and a fourth process, the first process is a process of acquiring differential data of backup data of M generations from an (N+1)th generation to an (N+M)th generation, which is one generation newer than a predetermined Nth generation (N is an integer of 1 or more), the second process is a process of storing the differential data in the cloud storage and overwriting a backup data of an Nth generation in the cloud storage, the third process is a process of merging from the management file of the Nth generation associated with the backup data of the Nth generation to a management file of the (N+M)th generation associated with backup data of the (N+M)th generation in the cloud storage and associating the management file with the backup data of the Nth generation, and the fourth process is a process of deleting backup data and management files of the (N+1)th generation to the (N+M)th generation in the cloud storage.

\* \* \* \* \*